United States Patent
Willey et al.

(10) Patent No.: US 9,470,909 B2
(45) Date of Patent: Oct. 18, 2016

(54) MOISTURE-RESISTANT ELECTRONIC SPECTACLE FRAMES

(71) Applicant: MITSUI CHEMICALS, INC., Tokyo (JP)

(72) Inventors: Charles Willey, Roanoke, VA (US); Joshua Haddock, Roanoke, VA (US); Mark Graham, Madison Heights, VA (US); Claudio Dalla Longa, Valdobbiadene (IT); Ronald Blum, Roanoke, VA (US); William Kokanaski, Gig Harbor, WA (US)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 14/715,127

(22) Filed: May 18, 2015

(65) Prior Publication Data
US 2015/0248026 A1 Sep. 3, 2015

Related U.S. Application Data

(63) Continuation of application No. 13/587,645, filed on Aug. 16, 2012, now abandoned, which is a continuation-in-part of application No. 13/372,240, filed on Feb. 13, 2012, now Pat. No. 8,801,174.

(Continued)

(51) Int. Cl.
*G02C 7/08* (2006.01)
*G02C 11/00* (2006.01)
(Continued)

(52) U.S. Cl.
CPC ............ *G02C 11/10* (2013.01); *G02B 27/017* (2013.01); *G02C 7/083* (2013.01); *G02C 7/101* (2013.01);
(Continued)

(58) Field of Classification Search
CPC ............................. G02C 7/083; G02C 7/101
USPC ............... 351/41–158, 178, 159.03, 159.39, 351/159.4
See application file for complete search history.

(56) References Cited

U.S. PATENT DOCUMENTS 2,930,857 A 3/1960 Hollingsworth
4,152,846 A 5/1979 Witt
(Continued)

FOREIGN PATENT DOCUMENTS

DE 2304134 8/1973
EP 0061002 9/1982
(Continued)

OTHER PUBLICATIONS

The International Preliminary Report on Patentability corresponding to the PCT/US2011/042882 application.
(Continued)

*Primary Examiner* — Scott J Sugarman
*Assistant Examiner* — Gary O'Neill
(74) *Attorney, Agent, or Firm* — Sterne, Kessler, Goldstein & Fox P.L.L.C.

(57) ABSTRACT

Eyewear including an optical functional member, control electronics, and a sealed electrical connective element connecting the electronics to the optical functional member. The connective element can directly connect the electronics to the optical functional member, or can connect through an intermediate contact, e.g., a plug-and-receptacle. The connective element can be routed from the electronics, around a rimlock of the eyewear to the optical functional member. The connective element can be a conductive compressible member, such as conductive rubber. In some embodiments, the connective element can be a multiconductor cable.

13 Claims, 22 Drawing Sheets

Related U.S. Application Data

(60) Provisional application No. 61/524,567, filed on Aug. 17, 2011, provisional application No. 61/537,205, filed on Sep. 21, 2011, provisional application No. 61/563,937, filed on Nov. 28, 2011.

(51) Int. Cl.
*G02C 7/10* (2006.01)
*G02B 27/01* (2006.01)
*H01R 35/04* (2006.01)
*G02C 13/00* (2006.01)
*H01R 13/24* (2006.01)

(52) U.S. Cl.
CPC ............ *G02C 13/001* (2013.01); *H01R 35/04* (2013.01); *G02B 2027/0178* (2013.01); *H01R 13/2414* (2013.01)

(56) References Cited

U.S. PATENT DOCUMENTS

| | | | |
|---|---|---|---|
| 4,243,306 A | 1/1981 | Bononi | |
| 4,283,127 A | 8/1981 | Rosenwinket et al. | |
| 4,418,990 A | 12/1983 | Gerber | |
| 4,756,605 A | 7/1988 | Okada et al. | |
| 4,875,030 A | 10/1989 | Chiu | |
| 4,907,860 A | 3/1990 | Noble | |
| 4,967,268 A | 10/1990 | Lipton et al. | |
| 4,991,258 A | 2/1991 | Drlik | |
| 4,991,951 A | 2/1991 | Mizuno et al. | |
| 5,182,585 A | 1/1993 | Stoner | |
| 5,463,428 A | 10/1995 | Lipton et al. | |
| 5,657,107 A | 8/1997 | Wagner et al. | |
| 5,742,379 A | 4/1998 | Reifer | |
| 5,760,869 A | 6/1998 | Mitamura | |
| 5,764,338 A | 6/1998 | Mack | |
| 5,835,185 A | 11/1998 | Kallman et al. | |
| 6,097,450 A | 8/2000 | Humphrey | |
| 6,115,177 A | 9/2000 | Vossler | |
| 6,336,250 B1 | 1/2002 | Takeda et al. | |
| 6,433,913 B1* | 8/2002 | Bauer .................... G02C 7/101 156/107 | |
| 6,582,075 B1 | 6/2003 | Swab et al. | |
| 6,595,634 B1 | 7/2003 | Pilat, Jr. | |
| 6,626,532 B1 | 9/2003 | Nishioka et al. | |
| 6,719,425 B2 | 4/2004 | Conner | |
| 6,772,448 B1 | 8/2004 | Hockaday et al. | |
| 6,866,386 B1 | 3/2005 | Chen | |
| 7,009,757 B2 | 3/2006 | Nishioka et al. | |
| 7,063,420 B2 | 6/2006 | Lerner et al. | |
| 7,104,645 B2 | 9/2006 | Pilat, Jr. | |
| 7,140,727 B2 | 11/2006 | Pilat, Jr. et al. | |
| 7,425,066 B2 | 9/2008 | Blum et al. | |
| 7,784,935 B2 | 8/2010 | Jackson et al. | |
| 7,813,048 B2 | 10/2010 | Lynch et al. | |
| 2001/0007493 A1 | 7/2001 | Masunaga et al. | |
| 2001/0043266 A1 | 11/2001 | Robinson et al. | |
| 2002/0140899 A1 | 10/2002 | Blum et al. | |
| 2004/0000733 A1 | 1/2004 | Swab et al. | |
| 2005/0078274 A1 | 4/2005 | Howell et al. | |
| 2005/0225723 A1 | 10/2005 | Pilu | |
| 2005/0237485 A1 | 10/2005 | Blum et al. | |
| 2005/0239502 A1 | 10/2005 | Swab et al. | |
| 2005/0242771 A1 | 11/2005 | Blum et al. | |
| 2005/0264752 A1 | 12/2005 | Howell et al. | |
| 2005/0270479 A1 | 12/2005 | Canavan et al. | |
| 2005/0270481 A1 | 12/2005 | Blum et al. | |
| 2006/0023158 A1 | 2/2006 | Howell et al. | |
| 2006/0092340 A1 | 5/2006 | Blum et al. | |
| 2006/0203186 A1 | 9/2006 | Ifergan | |
| 2007/0059503 A1 | 3/2007 | Park et al. | |
| 2007/0121061 A1 | 5/2007 | Kim | |
| 2007/0258039 A1 | 11/2007 | Duston et al. | |
| 2007/0296918 A1 | 12/2007 | Blum et al. | |
| 2008/0106695 A1 | 5/2008 | Kokonaski et al. | |
| 2008/0273166 A1 | 11/2008 | Kokonaski | |
| 2008/0316420 A1 | 12/2008 | Agazarova | |
| 2009/0201460 A1 | 8/2009 | Blum et al. | |
| 2009/0256977 A1 | 10/2009 | Haddock et al. | |
| 2010/0177277 A1* | 7/2010 | Kokonaski ............ G02C 7/083 351/159.39 |
| 2010/0201938 A1 | 8/2010 | Jackson et al. | |
| 2010/0265456 A1* | 10/2010 | Matsui ............ B29D 11/00634 351/158 |
| 2010/0309426 A1 | 12/2010 | Howell et al. | |
| 2011/0058141 A1 | 3/2011 | Cozzani | |
| 2012/0002159 A1 | 1/2012 | Blum et al. | |
| 2012/0002160 A1 | 1/2012 | Blum et al. | |
| 2012/0262667 A1 | 10/2012 | Willey | |
| 2013/0010256 A1 | 1/2013 | Haddock et al. | |
| 2013/0250233 A1 | 9/2013 | Blum et al. | |

FOREIGN PATENT DOCUMENTS

| | | |
|---|---|---|
| EP | 1647854 | 4/2006 |
| EP | 1727393 | 11/2006 |
| EP | 1916561 | 4/2008 |
| EP | 2233964 | 9/2010 |
| GB | 1563929 | 4/1980 |
| GB | 2170613 | 8/1986 |
| JP | 2008/083299 | 4/2008 |
| JP | 09294654 | 12/2009 |
| WO | WO 99/21400 | 4/1999 |
| WO | WO 01/02895 | 1/2001 |
| WO | WO 01/35159 | 5/2001 |
| WO | WO 2004/028203 | 4/2004 |
| WO | WO 2007/142520 | 12/2007 |
| WO | WO 2008/002388 | 1/2008 |
| WO | WO 2008/046858 | 4/2008 |
| WO | WO 2009/081542 | 7/2009 |
| WO | WO 2009/098719 | 8/2009 |
| WO | WO 2009/126946 | 10/2009 |
| WO | WO 2009/136667 | 11/2009 |
| WO | WO 2010/062504 | 6/2010 |
| WO | WO 2010/080999 | 7/2010 |

OTHER PUBLICATIONS

"Hearing Mojo: Varibel Hearing-Aid Glasses Integrate Eight Directional Microphones," Feb. 27, 2009, pp. 1-4, URL-http://hearingmojo.com/blog-mt/blog-mt/2006/04/varibel_hearingaid_glasses_dou.html.
European Search Report in related EP07852880.9 application.
International Search Report and Written Opinion in corresponding PCT/US2008/058056 application.
International Search Report corresponding to the PCT/US2011/042882 application.
International Search Report corresponding to the PCT/US2011/042883 application.
International Search Report corresponding to the PCT/US2011/043591 application.
International Search Report corresponding to the PCT/US2011/061495 application.
International Search Report corresponding to the PCT/US2011/061505 application.
Partial International Search Report corresponding to PCT/US2012/051202 application.
Partial International Search Report in corresponding PCT/US2010/020498 application.
U.S. Appl. No. 61/362,877, filed Jul. 9, 2010.
U.S. Appl. No. 61/441,817, filed Feb. 11, 2011.
U.S. Appl. No. 61/481,353, filed May 2, 2011.
U.S. Appl. No. 61/361,110, filed Jul. 2, 2010.
U.S. Appl. No. 61/376,719, filed Aug. 25, 2010.
U.S. Appl. No. 61/415,391, filed Nov. 19, 2010.

* cited by examiner

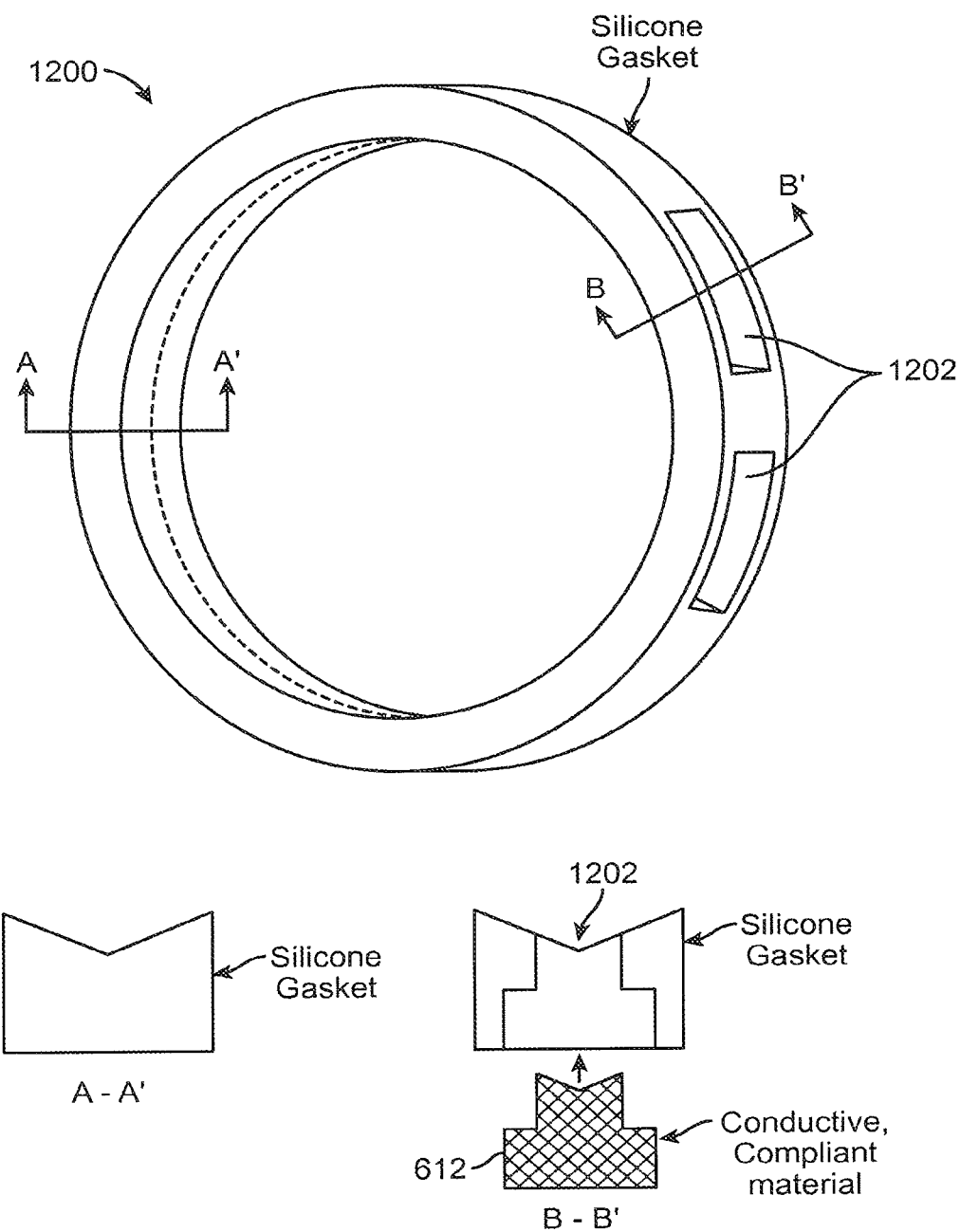
FIG. 12-A

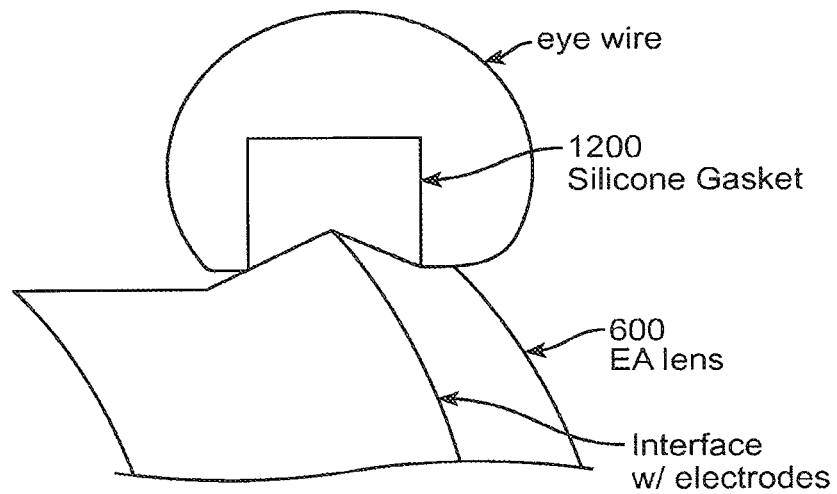
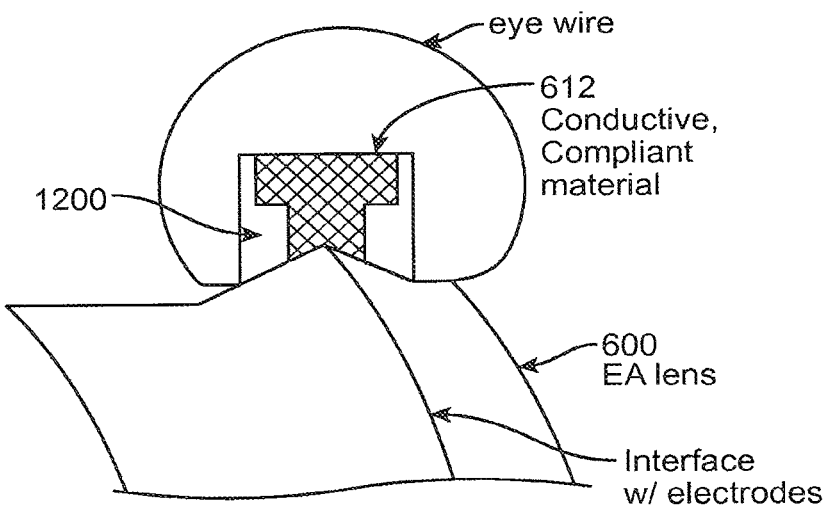
FIG. 12-B

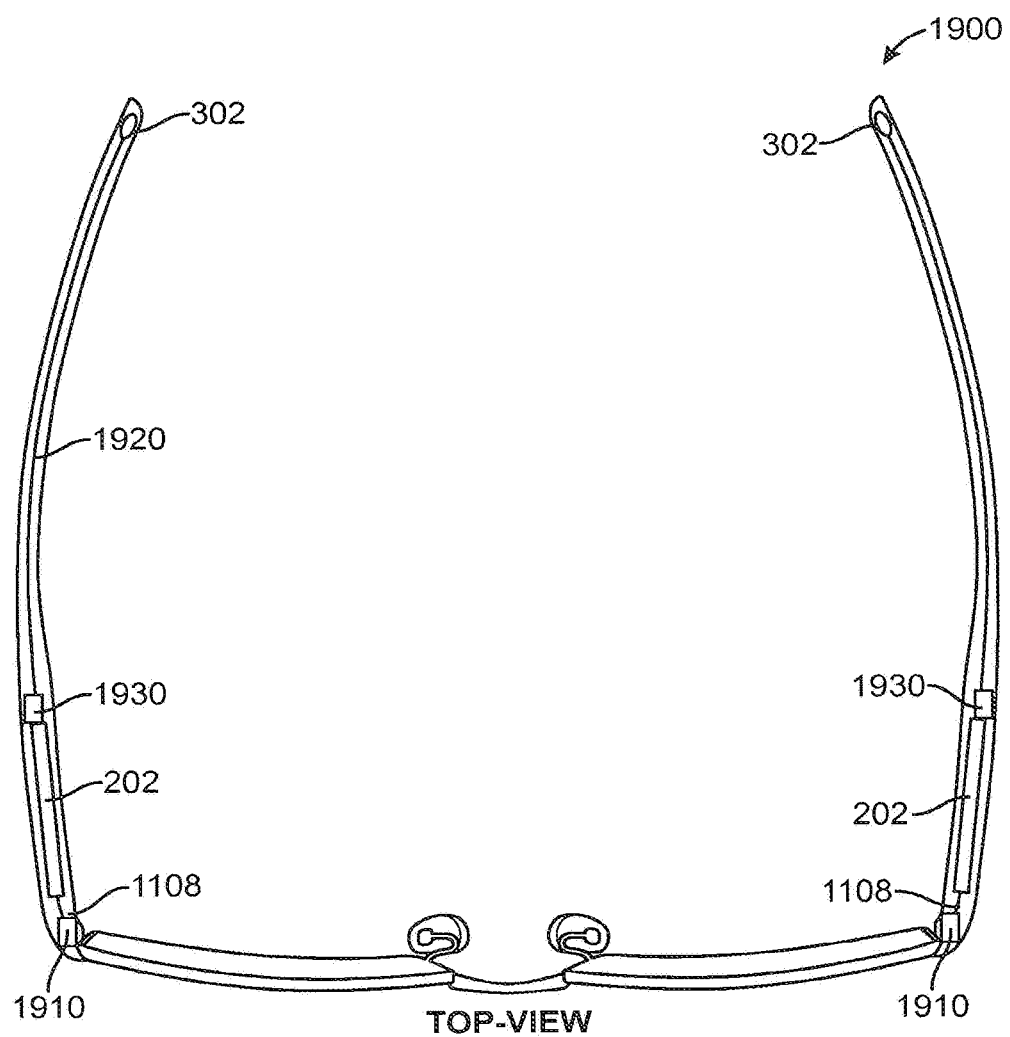
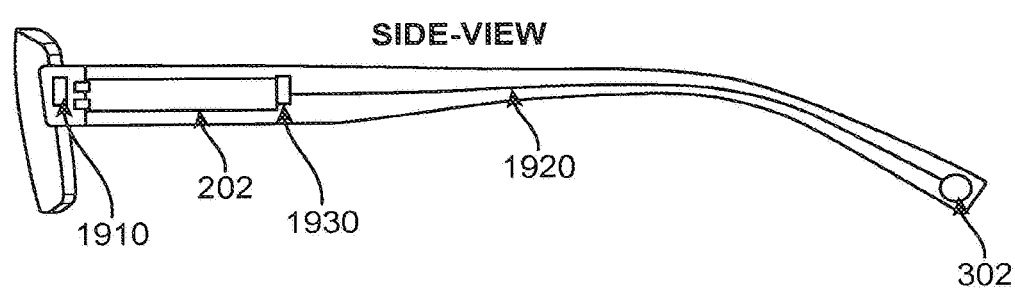
FIG. 18

MOISTURE-RESISTANT ELECTRONIC SPECTACLE FRAMES

CROSS-REFERENCE TO RELATED APPLICATIONS

The present application is a continuation of U.S. patent application Ser. No. 13/587,645, filed Aug. 16, 2012, which is a continuation-in-part of U.S. patent application Ser. No. 13/372,240, filed Feb. 13, 2012. U.S. patent application Ser. No. 13/587,645 also claims priority to: U.S. Prov. Pat App. No. 61/524,567, filed Aug. 17, 2011; U.S. Prov. Pat. App. No. 61/537,205, filed Sep. 21, 2011; and U.S. Prov. Pat. App. No. 61/563,937, filed Nov. 28, 2011. These applications are incorporated herein by reference in their entireties.

BACKGROUND

Electro-active lenses comprise electro-active material (e.g., a liquid crystal material, electro-chromic material, thermo-chromic material) Electro-active material is a material that with the application of electrical power or an electrical potential reversibly alter a characteristic of the material. Electro-active eyewear as well as all eyewear of any kind comprising electronics may be exposed to moisture and liquids. Such moisture may come from the natural environment (e.g., rain, snow), from the human body in the form of oils and perspiration, and from consumer products such as liquid lens cleaners and cosmetics.

SUMMARY

The technology includes eyewear having an optical functional member, an electronics module, and at least one sealed conductive element. The electronics module can include electronics for controlling the optical functional member. The sealed electrical connective element connects the electronics of the electronics module to the optical functional member. The optical functional member can include an electrical connector, and the connective element can directly connect the electronics of a sealed electronics module to the electrical connector of the optical functional member.

In some embodiments, the eyewear can include an intermediate electrical contact. In those embodiments, the optical functional member can include an electrical connector, and the connective element can connects the electronics of the electronics module to the electrical connector(s) of the optical functional member through the intermediate electrical contact. The intermediate electrical contact can be a plug-and-receptacle electrical contact. In some embodiments, the intermediate electrical contact is located at one of: a rim of the eyewear, the rear ⅓ of the temple, the middle of the temple, the forward ⅓ of the temple, the rimlock or hinge, of the eyewear, a surface of the optical functional member, a frame front of the eyewear, an electronic display, an electronic controller, and between the rim and the lens of the eyewear.

In some embodiments, the eyewear can include a temple and a rimlock. In those embodiments, the electronics module can be located in the temple, and the connective element can be routed from the electronics module through the rimlock to the optical functional member. In some embodiments, the rimlock includes an upper rimlock and a lower rimlock, and the connective element is routed between the upper rimlock and the lower rimlock. The rimlock can include upper rimlock and a lower rimlock, and the connective element can form a layer between the upper rimlock and the lower rimlock. The layer can be insulating. In some embodiments, the connective element can be a conductive compressible member that can be conductive rubber. In some embodiments, the connective element comprises a multi-conductor cable.

The technology includes an eyewear frame that includes an electronics module and at least one conductive element. The electronics module includes electronics for controlling an optical functional member. The sealed electrical connective element(s) can connect the electronics of the electronics module at a first end of the connective element, and can connect to an optical functional element at a second end of the connective element. The sealed electrical connective element can connect one electrical module to another electrical module or to a plurality of different electrical modules. In some embodiments, the optical functional member includes at least one electrical connector, and the connective element can directly connect the electronics of a sealed electronics module to the electrical connector of the optical functional member.

In some embodiments, the frame includes at least one intermediate electrical contact, and the optical functional member comprises at least one electrical connector. In such embodiments, the connective element can connect the electronics of the electronics module to the electrical connector of the optical functional member through the intermediate electrical contact. In some such embodiments, the intermediate electrical contact is a plug-and-receptacle.

the intermediate electrical contact is located at one of: a rim of the eyewear, the rear ⅓ of the temple, the middle of the temple, the forward ⅓ of the temple, the rim lock or hinge, of the eyewear, a surface of the optical functional member, a frame front of the eyewear, an electronic display, an electronic controller, and between the rim and the lens of the eyewear.

In some embodiments, the eyewear frame can include a temple and a rimlock. In such embodiments the electronics module can be located in the temple, and the connective element can be routed from the electronics module through the rimlock to the optical functional member. In some such embodiments, the rimlock can include an upper rimlock and a lower rimlock, and the connective element can be routed between the upper rimlock and the lower rimlock. In some such embodiments, the rimlock can include an upper rimlock and a lower rimlock, and the connective element can form a layer between the upper rimlock and the lower rimlock. The layer can be an electrically insulating layer. The connective element can be a conductive compressible member, which can be conductive rubber. The connective element can be a multi-conductor cable.

The technology includes eyewear including at least one electrical conductor and at least one non-electrically-conductive grease coating a portion of the electrical conductor. In such embodiments, the grease can be silicone grease.

The disclosed technology includes methods of assembling eyewear. Some such methods include coating a portion of at least one electrical conductor of the eyewear with non-electrically-conductive grease, which can be silicone grease. In some such methods, the grease can be applied between surfaces of a conducting portion of a rimlock of the eyewear and an insulating layer of the eyewear.

The disclosed technology includes additional methods of assembling eyewear. Such methods include affixing a portion of eyewire to a rimlock to form a first stage assembly, wherein each surface point of the first stage assembly comprises an single electrical node; bisecting the first stage assembly, forming an upper rimlock with upper eyewire and a lower rimlock with lower eyewire; and coating the bisected first stage assembly with an electrically-insulating coating. Some such methods include removing the coating from at least one area of electrical connection.

The technology also includes eyewear including a lens comprising electro-active material, and in some cases a gasket. The electro-active lens, can be characterized by a lens edge, and can include at least one electrical contact on the lens edge. The gasket can be configured to fit around the lens edge to be substantially resistant to the ingress of liquid between the gasket and the lens edge. The gasket can have formed therein an aperture to corresponding to the electrical contact. In such embodiments, the electrical contact surface can be a conductive compliant material fitted to the aperture to substantially resist the ingress of liquid between the gasket and the electrical contact. In other embodiments the connection from the connector to the lens or optical functional member can be sealed by way of example only, an adhesive, caulk, or another material that forms a water resistant barrier.

In some embodiments, the technology can include an eyewear temple assembly that includes a temple body and an electronics module. The temple body can form a cavity therein, and can be configured to be removeably attachable to eyewear. The electronics module can be housed in the cavity, and can be operable to perform a function other than control of electro-active optics. In such embodiments, the temple assembly is configured to maintain the electronics module at least one of moisture resistant, salt resistant, and moisture proof. In some such embodiments, the electronics module includes at least one of: a transmitter operable to transmit a signal in response a user input; a sensor operable to sense at least one of: the environment of the electronics module, and a condition of the electronics module; and an output module operable to output at least one of: an acoustic signal, a visible light signal, and a vibration signal. In some such embodiments containing a sensor, the electronics module includes s at least one of a temperature sensor, a position sensor, an electromagnetic radiation sensor, GPS, and a pedometer.

In some embodiments of the temple assembly, the cavity can be formed with an opening at a surface of the temple body, and a cover of the eyewear temple can seal the opening, in a fashion that electronics module is maintained as at least one of moisture resistant, salt resistant, and moisture proof at least in part by the cover. In some such embodiments, the cavity can be formed with only one opening, and the one opening is at a front surface of the temple body. In other such embodiments, the cavity can be formed with only one opening, and the one opening is at a wearer-facing surface of the temple body. In some embodiments of the temple assembly, the electronics module can be is releasably secured in the cavity, and the electronics module itself can be at least one of moisture resistant, salt resistant, and moisture proof.

DESCRIPTION OF THE DRAWINGS

FIG. 12-A and FIG. 12-B illustrate a gasket of the present technology.

FIG. 18 illustrates electro-active spectacles in accordance with an aspect of the present technology employing plug connections among electrical elements.

DETAILED DESCRIPTION

While enabling embodiments of the present technology are disclosed in the context of electro-active eyeglasses having at least one electro-active lens as an optical functional member, the technology can find application where the optical functional member is other than an electro-active lens, e.g., in fluid lenses being activated by way of an electronic actuator, mechanical or membrane lenses being activated by way of electronics, electro-chromic lenses, electronic fast tint changing liquid crystal lenses, thermochromic lenses, lenses that by way of an electrical charge can resist or reduce the attraction of dust particles, lenses or eyeglass frames housing or having an electronic display affixed thereto, electronic eyewear providing virtual reality, electronic eyewear providing 3-D capabilities, electronic eyewear providing gaming, and electronic eyewear providing augmented reality.

Figure 1:
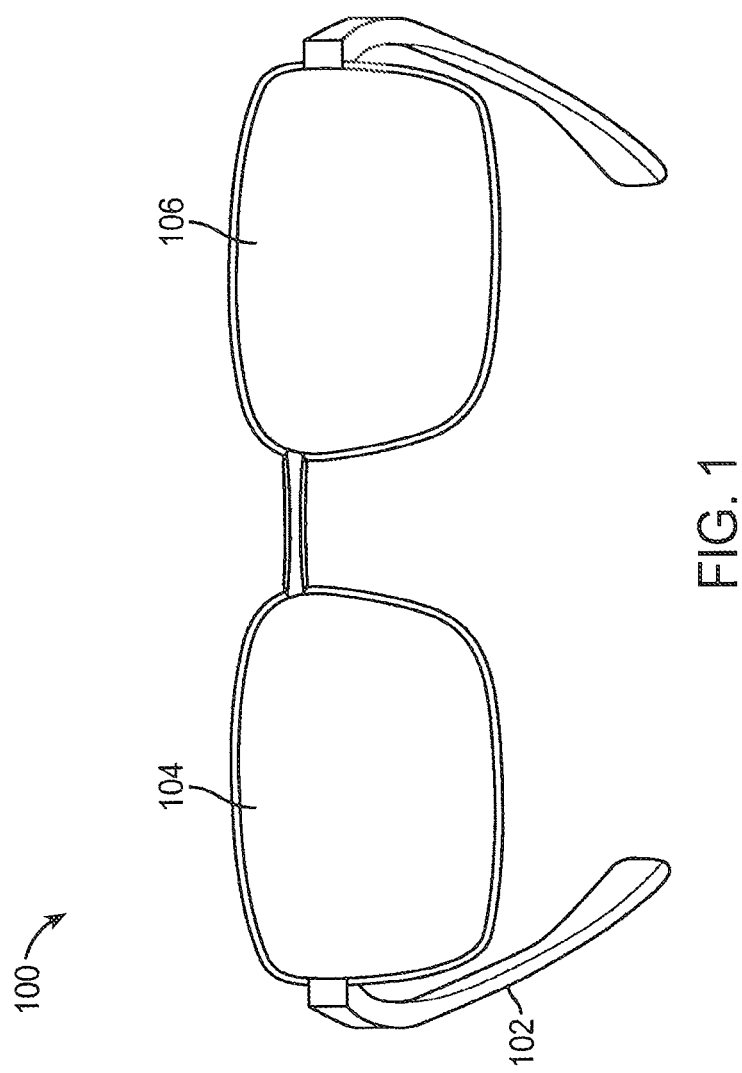
FIG. 1 illustrates electro-active spectacles in accordance with an aspect of the present technology.

FIG. 1 illustrates electro-active spectacles or eyeglasses 100 in accordance with an aspect of the present technology. The electro-active spectacles 100 shown in FIG. 1 are fully rimmed eyeglasses comprising left and right temples and a frame front (the frame front can comprise left and right eyewires or rims, and a bridge, as will be appreciated by one skilled in the pertinent art). Electro-active spectacles and frames of the present technology can be fully rimmed, partially rimmed, or rimless. The electro-active spectacles 100 can include a frame 102, a first electro-active lens 104, and a second electro-active lens 106. The first and second electro-active lenses 104 and 106 can each be an electro-active lens as described in U.S. patent application Ser. No. 12/408,973 thereinafter the '973 application), filed Mar. 23, 2009, entitled "Electro-Active Diffractive Lens and Method for Making the Same," which is hereby incorporated by reference in its entirety. In general, the first and second electro-active lenses 104 and 106 can be any lens or optic capable of changing, varying or tuning the optical power they each provide with the application of electricity.

The right temple portion can be considered to be a first temple portion that is positioned adjacent to the first electro-active lens 104. The left temple portion can be considered to be a second temple portion that is positioned adjacent to the second electro-active lens 106. The bridge can be considered to be part of the frame or to be a separate portion of the electro-active spectacles 100 that connects, joins or supports the first and second electro-active lenses 104 and 106. The electro-active spectacles 100 can include one or more power sources for powering the first and second electro-active lenses 104 and 106. As an example, each power source can include one or more batteries (e.g., conventional rechargeable batteries and/or solar batteries). The electro-active spectacles 100 can also include electronics that can govern operation of the electro active lenses 104 and 106. The electronics can comprise one or more control units (e.g., a control unit matched to each electro-active lens) to determine when to activate and when to deactivate the electro-active lenses 104 and 106. The one or more power sources and the electronics of the electro-active spectacles 100 can be housed or contained within, or on, any portion of the frame 102. The one or more power sources and the one or more control units of the electro-active spectacles 100 can be grouped together or distributed or dispersed in any manner within, throughout, or on the frame 102.

The operation of the electro-active lenses 104 and 106 can be synchronized. That is, the one or more control units housed in the frame 102 can coordinate the activation and deactivation of the electro-active lenses 104 and 106 such that the electro-active lenses 104 and 106 are activated or deactivated at substantially the same time.

The one or more control units housed in the frame 102 can automatically operate (e.g., activate and deactivate) the electro-active lenses 104 and 106. As an example, the electro-active lenses 104 and 106 can be activated or deactivated based on a user's head tilt as sensed by the one or more control units. The one or more control units can also enable a user to interact with the electro-active lenses 102 and 104. As an example, a user can manually activate or deactivate the electro-active lenses 104 and 106, override automatic operation of the electro-active lenses 104 and 106, place the electro-active spectacles 100 into a standby mode (in which the electro-active lenses 104 and 106 are neither automatically or manually activated or deactivated), or power off the electro-active spectacles 100.

The electronics of the electro-active spectacles 100 can include a processor, memory, a power source (e.g., a battery), a gyroscope, and an accelerometer. As previously mentioned, these components can be grouped together or can be distributed within different portions of the frame 102. As an example, all or a portion of these components can be grouped together to form a self-contained electronic module. The electro-active spectacles 100 can comprise a single electronic module that governs synchronized operation of both the first and second electro-active lenses 104 and 106. Alternatively, operation of the first electro-active lens 104 can be governed by a first electronic module and operation of the second electro-active lens 106 can be governed by a second electronic module. Under this scenario, the first and second electronic modules can communicate using one or modes of electrical connectivity (e.g., wire(s) embedded within a portion of the frame, conductive portion(s) of the frame, conductive metal layer(s) or core(s) encapsulated by non-conductive material, conductive layer(s) of the electro-active lens(es) 104 and 106, optical link(s), wireless radio frequency or magnetic field communication).

Figure 2:
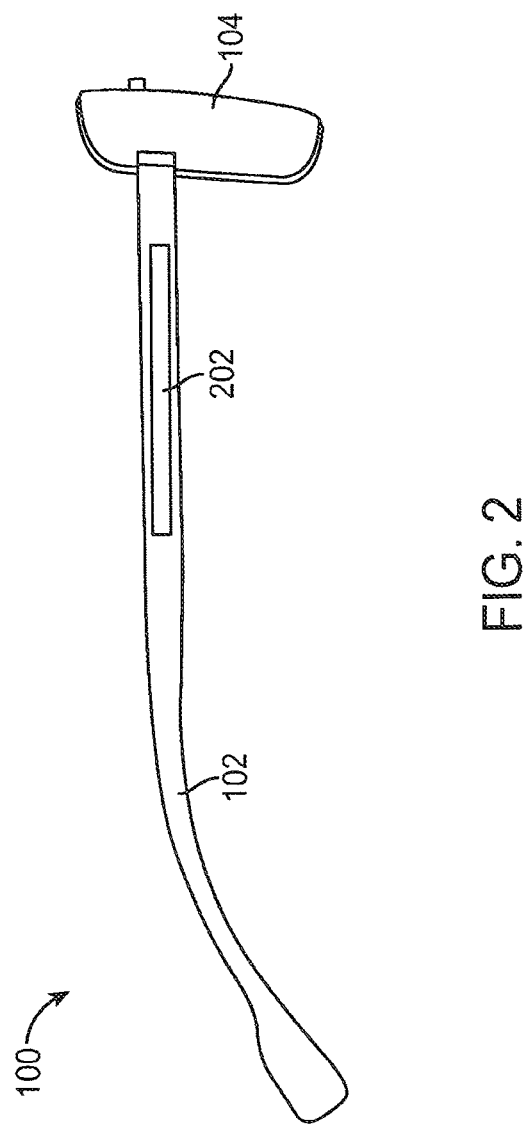
FIG. 2 illustrates a side view of the electro-active spectacles depicted in FIG. 1 accordance with an aspect of the present technology.

FIG. 2 illustrates a side view of the electro-active spectacles 100 depicted in FIG. 1. As shown in FIG. 2, the electro-active spectacles 100 can comprise an electronic module (or control unit) 202. As described above, the electronic module 202 can include various electronics components. The electronic module 202 can be positioned near the front temple of the frame 102. The electronic module 202 can be positioned within the frame 102 (e.g., in an area or cavity of the frame 102) and can be removable and replaceable. Alternatively, the electronic module can be built into the frame 102 and form a part of the frame 102. The electronic module 202 can be located on an outer portion of a temple of the frame 102 (further from a wearer) or can be located on an inner portion of the temple of the frame 102 (closer to the wearer). The electronic module 202 can be positioned on a left temple or a right temple of the frame 102 (i.e., on either side of the frame 102). The electronic module 202, when inserted into the temple of the frame 102, can be flush with the other portions of the frame 102. All or a portion of the electronic components used to operate the electro-active lens 104, 106 can be contained within the electronic module 202.

The electronic module 202 can also control operation (or at least ensure synchronized operation) of the electro-active lens 104, 106. Electrical connections between the electronic module 202 and one or more of the electro-active lenses 104 and 106 can be routed through the frame 102 and/or the electro-active lenses 104 and 106 as will be described in more detail below. According to an aspect of the present technology, connectivity between the electronic module 202 and one or more of the electro-active lenses 104 and 106 can be accomplished by using a single conductive wire.

In some embodiments of the present technology, a first electrical connection (e.g., comprising one or more conductive links or wires) can be used to provide connectivity between one or more power sources of the electro-active spectacles 100 and one or more electronic modules 202 and a second electrical connection (e.g., comprising one or more conductive links or wires) can be used to provide connectivity between the one or more electronic modules 202 and the one or more electro-active lenses (e.g., the electro-active lenses 104 and 106). For example, a battery positioned within the frame 102 can be coupled to an electronic module 202 also positioned within the frame 102 using a first conductive link. A second, distinct conductive link (e.g., electrically isolated from the first conductive link) can be used to couple the electronic module 202 to the electro-active lenses 104 and 106.

In some embodiments of the present technology, the same electrical connection (e.g., comprising one or more electrical wires) can be used to couple the one or more power sources of the electro-active spectacles 100, the one or more electronic modules 202 and the electro-active lenses 104 and 106 as will be appreciated by one skilled in the pertinent art. This can enable a power source to be positioned on one side of the frame 102 (e.g., in a first temple) and an electronic module 202 to be positioned on the other side of the frame 102 (e.g., in a second temple) while using the same conductive link to simultaneously provide power to the electronic module 202 and controlling signals from the electronic module 202 to the electro-active lenses 104 and 106. As a result, the number of conductive links (e.g., embedded wires) positioned within the frame 102 can be minimized.

Figure 3:
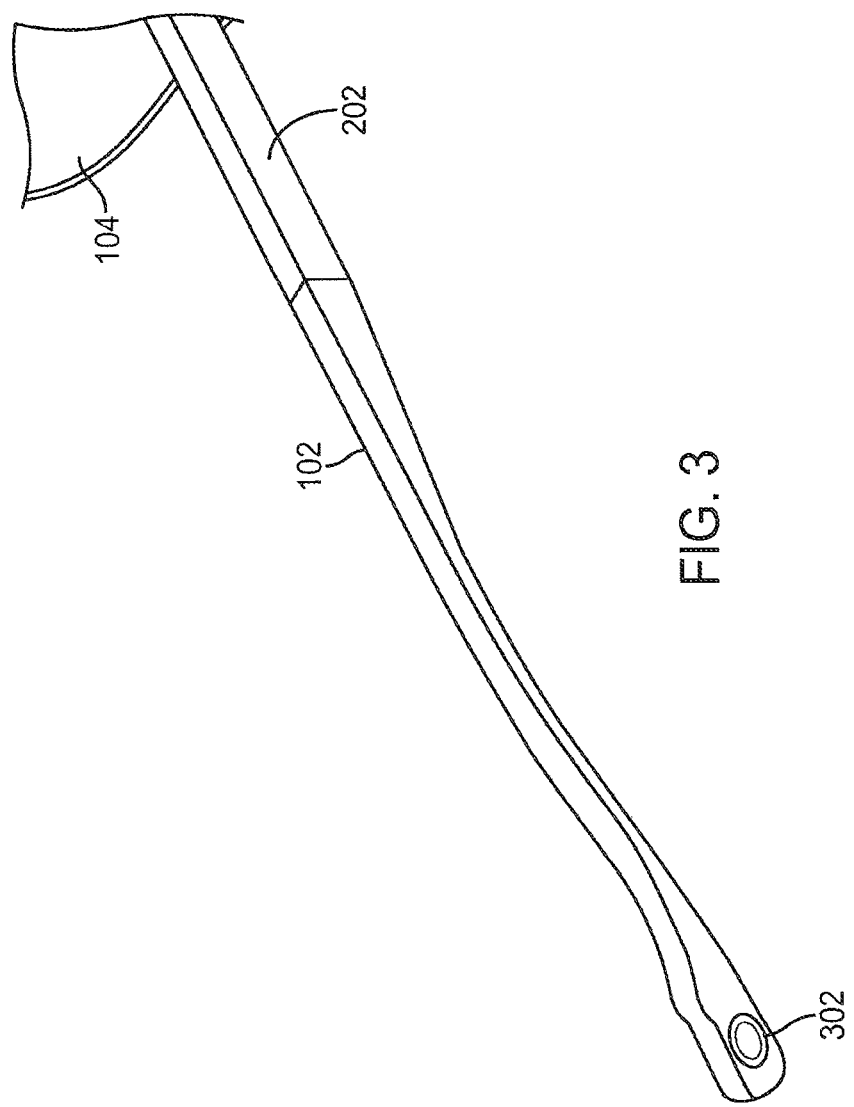
FIG. 3 illustrates an exemplary configuration of electrical components of the electro-active spectacles in accordance with an aspect of the present technology.

FIG. 3 illustrates an exemplary configuration of electrical components of the electro-active spectacles 100. Specifically, FIG. 3 shows a battery 302 located near the end of the frame 102 of the electro-active spectacles 100. A portion of the end of the frame 102 is removed for illustration purposes only. The battery 302 can be a rechargeable battery and can provide power to the electrical components located within the electronic module 202. The battery 302 can provide power to one or more electronic modules of the present technology.

Figure 4:
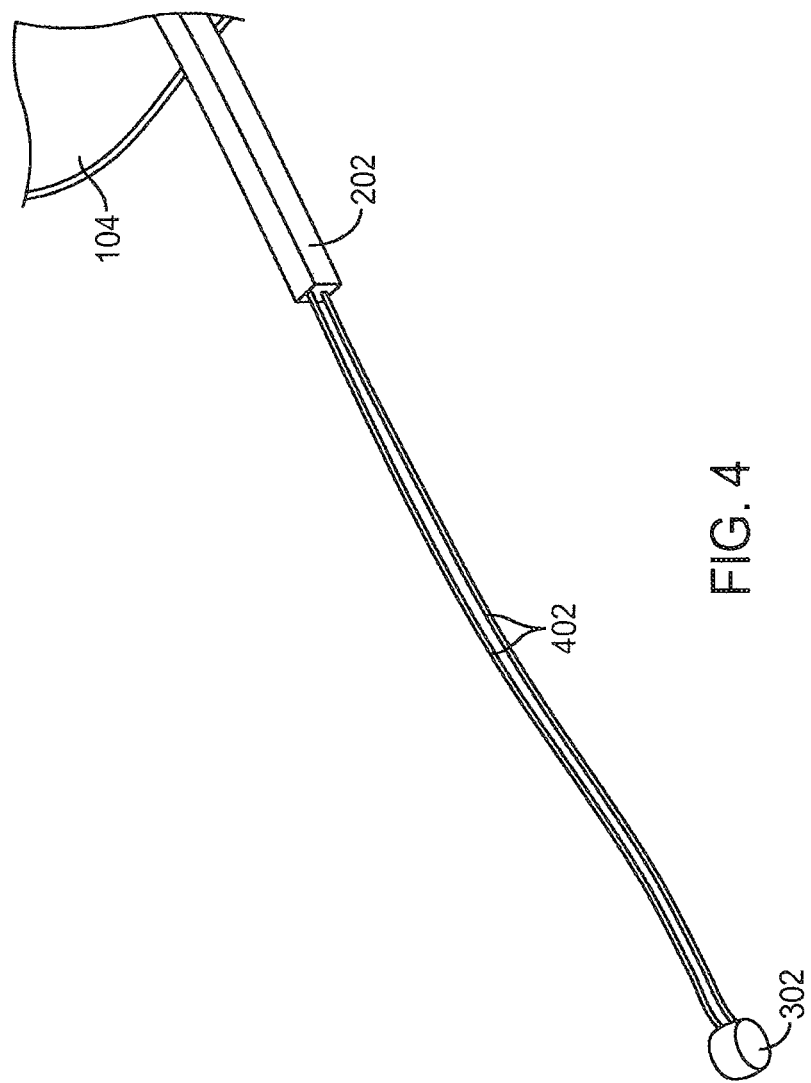
FIG. 4 illustrates an exemplary configuration of electrical connectivity between a battery and an electronic module depicted in FIG. 3 in accordance with an aspect of the present technology.
Figure 5:
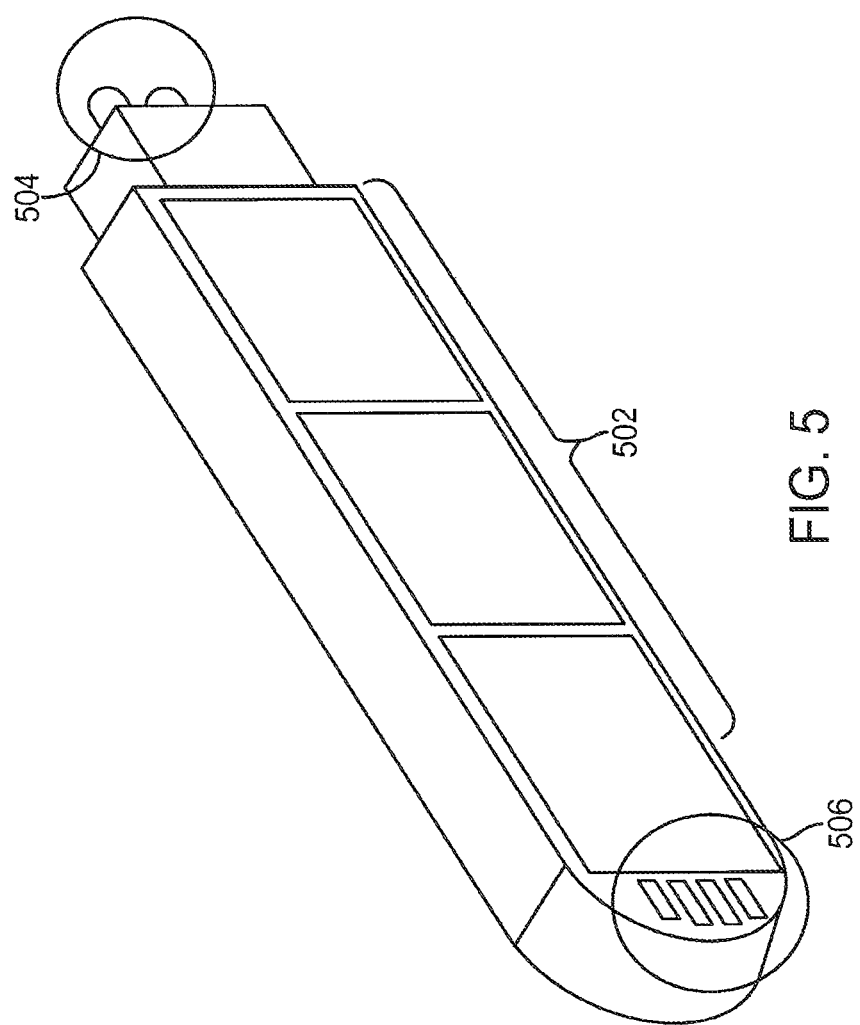
FIG. 5 illustrates an electronic module in accordance with an aspect of the present technology.

FIG. 4 illustrates an exemplary configuration of electrical connectivity between the battery 302 depicted in FIG. 3 and the electronic module 202. A portion of the frame 102 is removed for illustration purposes only. As shown in FIG. 4, conducting wires 402 can couple the battery 302 to the electronic module 202. The conducting wires 402 can be positioned within the frame 102 (e.g., embedded within the frame 102) of the electro-active spectacles 100. Conducting wires 402 are insulated and capable of being heated and bent while retaining conductor and insulator integrity in order to adjust the shape of temple. The conducting wires can be a cable or a flexible cable FIG. 5 illustrates the electronic module 202 in accordance with an aspect of the present technology. The electronic module 202 can contain all or a portion of the electronic components that govern operation of one or more electro-active lenses including a power source (e.g., a rechargeable battery or a solar battery). As shown in FIG. 5, the electronic module 202 can comprise a housing 502, first contacts 504 and second contacts 506. The housing 502 can contain the electrical components of the electronic module 202—e.g., a processor, memory, power source, and/or a gyroscope/accelerometer.

The first contacts 504 can provide electrical connectivity between the electrical components of the housing 502 and other portions of one or more associated electro-active lens (e.g., the first electro-active lens 104). The second contacts 506 can provide electrical connectivity to a memory of the electronic module 506. The second contacts 506 can be used, for example, to program or reprogram the electronic module 202 directly. Additional contacts (not illustrated for simplicity), or the first and/or second contacts 504 and 506, can also provide connectivity to a remote battery (e.g., the battery 302 depicted in FIG. 3 and FIG. 4) or to another electronic module or control unit. Alternative or additional contacts (e.g., an antenna) can allow wireless programming of the electronic module 202.

In general, the electronic module 202 can be positioned anywhere on the frame 102 (e.g., in any portion of the frame 102 having an area or cavity designed to accept insertion of the electronic module 202). The electronic module 202, as shown in FIG. 2, can be located near the front temple of a wide variety of frame types and styles. Specifically, the electronic module 202 can be located within a portion of a frame that is fully rimmed, partially rimmed, or rimless.

The electronic module 202 can be removed and replaced with a new module or can be reprogrammed. As an example, the electronic module 202 can be initially programmed with a first mode of operation or a first prescription for a user. At a later time, the electronic module 202 can be removed and reprogrammed using the second contacts 506 with a second mode of operation or a second prescription for a user.

Figure 6:
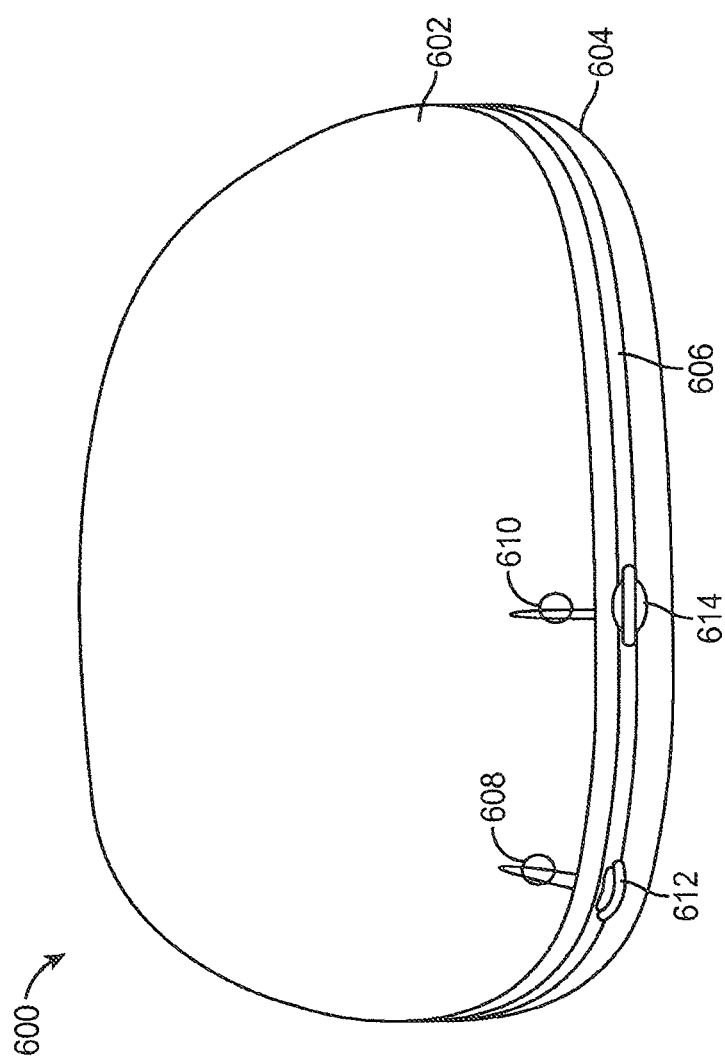
FIG. 6 illustrates an electro-active lens in accordance with an aspect of the present technology.

FIG. 6 illustrates an electro-active lens 600 in accordance with an aspect of the present technology. The electro-active lens 600 can represent one of the electro-active lenses 104 or 106. The electro-active lens 600 is depicted as a finished lens in FIG. 6. That is, the electro-active lens 600 has been edged and grooved to fit into an eyeglass frame.

As shown in FIG. 6, the electro-active lens 600 can comprise a first substrate (e.g., a top substrate) 602 and a second substrate (e.g., a bottom substrate) 604. During an edging process, a groove 606 can be formed (e.g., near or between the interface of the first and second substrates 602 and 604). The groove 606 can be used to position and stabilize the electro-active lens 600 within an eyeglass frame as is done with conventional lenses.

The electro-active lens 600 can comprise a first electrical lead or connector 608 and a second electrical lead or connector 610. The first and second electrical leads 608 and 610 can provide power (e.g., a drive signal or a control signal) to the electro-active region of the electro-active lens 600. In particular, the first and second electrical leads 608 and 610 can link or connect the electro-active region of the electro-active lens 600 to a power source and electronic components that can be housed within an associated eyeglass frame (e.g., the electronic module/control unit 202 depicted in FIG. 5). The first and second electrical leads 608 and 610 can comprise any conductive material including, but not limited to, silver ink. The first and second electrical leads 608 and 610 can be painted, applied or otherwise deposited onto the transparent conductive layers placed on the substrates 602 and 604.

To ensure or improve connectivity, after edging and grooving the electro-active lens 600, a small quantity of conductive material, paint or paste can be placed on top of the first and second electrical leads 608 and 610. Specifically, as shown in FIG. 6, a first conductive material 612 can be placed in the groove 606 on top of the first electrical lead 608 and a second conductive material 614 can be placed in the groove 604 on top of the second electrical lead 610. The first and second conductive materials 612 and 614 can be substantially transparent and can comprise an indium tin oxide (ITO) paste or a paint containing silver particles (e.g., silver ink).

Figure 7:
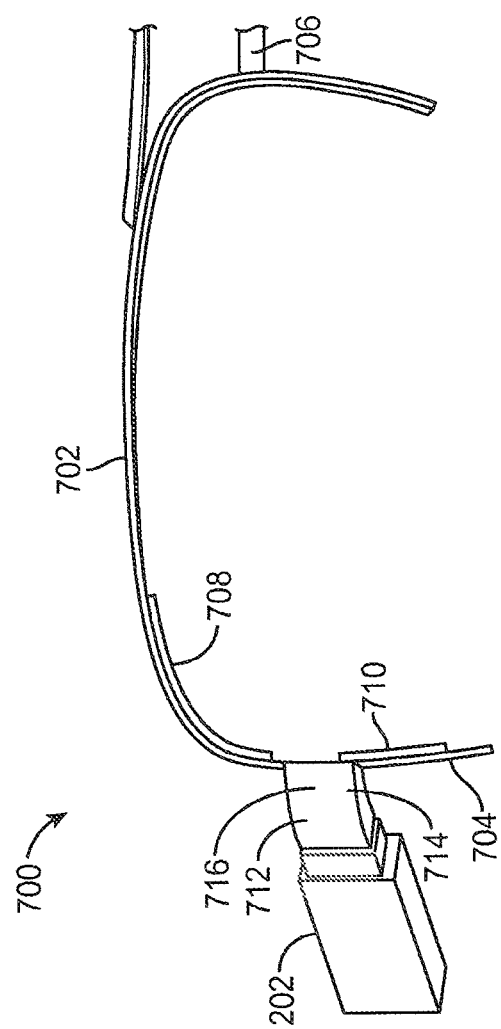
FIG. 7 illustrates a portion of a frame in accordance with an aspect of the present technology.

FIG. 7 illustrates a portion of a frame 700 in accordance with an aspect of the present technology. The frame 700 can provide electrical connectivity between the electro-active lenses (not depicted in FIG. 7 for simplicity) and the electrical components used to operate electro-active lenses.

The frame 700 can include an upper portion of the right eye-wire or rim 702 and a lower portion of the right eye-wire or rim 704. For a fully rimmed frame, the lower portion 704 can extend underneath an electro-active lens to a bridge 706. For a partially-rimmed frame, the lower portion 704 generally does not extend to the bridge 706.

The frame 700 can include an electronic module 202 and an area to accept an electronic module 202. A first conductor 708 can be positioned within a groove of the upper rim portion 702. A second conductor 710 can be positioned within a groove of the lower rim portion 704. The first and second conductors 708 and 710 can comprise flexible, compressible materials. When an electro-active lens, e.g., the electro-active lens 600 depicted in FIG. 6, is positioned within the frame 700, the first and second conductors 708 and 710 can be compressed to fit in the groove of the upper and lower rim portions 708 and 710, respectively, and the groove 606 of the electro-active lens 600. The first conductor 708 can be positioned to make contact with the first conductive material 612. The second conductor 710 can be positioned to make contact with the second conductive material 614.

The frame 700 can include an upper conducting member 712, a lower conducting member 714 and an insulating or isolation member 716. The upper conducting member 712, the lower conducting member 714 and the insulating member 716 can physically couple the temple of the frame 700 to the eye-wire portion (i.e., the upper and lower rim portions 702 and 704).

The upper conducting member 712 can be one link in the electrical connectivity between the electronic module 202 and the first conductor 708. The first conductor 708 can provide connectivity to the first conductive material 612 (and, as a result, connectivity to the first electrical lead 608) depicted in FIG. 6. The lower conducting member can be one link in the connectivity between the electronic module 202 and the second conductor 710. The second conductor 710 can provide connectivity to the second conductive material 614 (and, as a result, connectivity to the second electrical lead 610) depicted in FIG. 6. The insulating member 716 can ensure that the connectivity path between the electronic module 202, the upper conducting member 712 and the first conductor 708 remains insulated or electrically separated from the connectivity path between the electronic module 202, the lower conducting member 714 and the second conductor 710.

Any portion of the upper conducting member 712 and the lower conducting member 714 can provide a conductive link. As an example, the entirety of the upper and lower conducting members 712 and 714 can be conductive (e.g., made of metal and coated with a non-conductive material) or a portion of the upper and lower conducting members 712 and 714 can be conductive (e.g., an internal portion that is encapsulated by non-conductive material).

Figure 8:
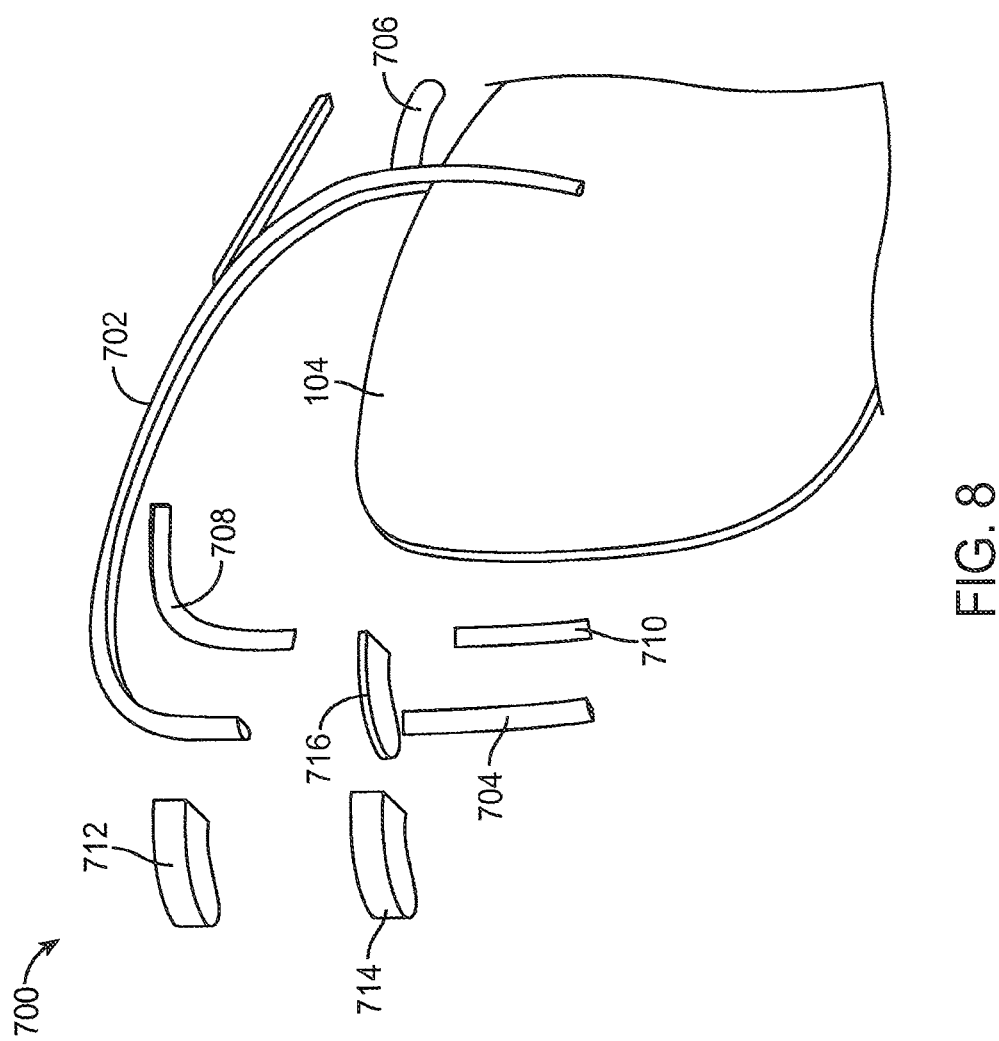
FIG. 8 illustrates an exploded view of the frame depicted in FIG. 7 in accordance with an aspect of the present technology.

FIG. 8 illustrates an exploded view of the frame 700 depicted in FIG. 7. As shown in FIG. 8, the frame 700 can be assembled by connecting the upper conducting member 712, the insulating member 716 and the lower conducting member 714 to the upper rim portion 702 and the lower rim portion 704. The first conductor 708 and the second conductor 710 can then be positioned in the groove of the upper rim portion 702 and the lower rim portion 704, respectively. The first and second conductors 708 and 710 can be positioned in areas where they will make contact with the first conductive material 612 and the second conductive material 614, respectively.

The components illustrated in FIG. 7 and FIG. 8 (namely, the upper conducting member 712, the lower conducting member 714, the insulating member 716, the upper rim portion 702, the lower rim portion 704, the first conductor 708 and the second conductor 710) can be used to form a portion of the frame 700 as a partially-rimmed frame or a fully-rimmed frame and to provide connectivity between an electronic module of the present technology and an electro-active lens of the present technology for each type of frame (and a variety of styles therein).

For a fully-rimmed frame, both the upper rim portion 702 and the lower rim portion 704 can extend from the upper conducting member 712 and the lower conducting member 714, respectively, to the bridge 706. For a partially-rimmed frame, generally only the upper rim portion 702 extends from the upper conducting member 712 to the bridge 706 while the lower rim portion 704 does not extend to the bridge 706.

When the frame 700 is implemented as a fully-rimmed frame or a partially-rimmed, the first conductor 708 can be of any size or length. That is, the first conductor 708 can extend along any portion of the upper rim 702 to make electrical connectivity with a desired lead of the electro-active lens 104. When the frame 700 is implemented as a fully-rimmed frame, the second conductor 710 can similarly be of any size or length to make electrical connectivity with a separate or second desired lead of the electro-active lens 104. However, when the frame 700 is implemented as a partially-rimmed frame, the second conductor 710 will be of the same length or shorter than the lower rim portion 704.

Electro-active eyewear or electronic eyewear may be exposed to moisture and liquids. Such moisture may come from the natural environment (e.g., rain, snow), from the human body in the form of oils and perspiration, and from consumer products such as liquid lens cleaners and cosmetics. The ingress of such materials into and between the electronic components of the eyewear can cause damage, e.g., electrical short circuits. In particular, salt residue, e.g., left over from dried perspiration or exposure to salt water, salt spray, or salt fog, can facilitate even small amounts of moisture to form an unintended conductive path in electro-active eyewear.

For example, a rimlock such as the rimlocks shown in FIG. 7 and FIG. 8 may wick moisture into its internal surfaces. If this moisture is water, then the result may be a temporary electrical short circuit across the rimlock (e.g., between metal components 712 and 714), which can result in a hazy or non-functional lens. When the water dries, then normal operation is typically restored.

If the moisture is perspiration, then over time the accumulation of salts and oils due to repeated exposure can result in permanent electrical shorts and/or make the frame even more susceptible to other forms of moisture. Additionally, if the electrical path includes spring-loaded "pogo" pins, such as described in International Pat. App. No. PCT/US2010/020498, exposure to perspiration may corrode and bind such pins, resulting in an unreliable connection between the module and the rimlock.

Also, if the lens and physically compliant conductive materials are exposed to perspiration, then these materials can break down both physically and chemically. Specifically, the conductive primers and inks that are applied to the lens 104 to establish the electrical edge connections may be susceptible to perspiration and can break down over the course of a few weeks, resulting in a lens with high series resistance and a hazy on-state appearance.

Consider a type of rimlock which is assembled by attaching (e.g., welding, soldering, brazing) a piece of eyewire to one metal rimlock component that combines components 712 and 714. This assembly, forming a single electrical node, is then coated with an electrically-insulating color finish and lastly, the coated assembly is bisected (e.g., sawn, cut) to form the upper and lower eye-wire and rimlock portions. One drawback to this approach is that bisecting this assembly after coating exposes uncoated metal that, when exposed to moisture, may create an electrical short.

In some embodiments of the present technology, the rimlock is attached (e.g., welded, soldered, brazed) to the eye-wire (thus forming a single electrical node), bisected (e.g., sawn, but not necessarily in half, to form two separate electrical nodes), and then coated with electrically-insulating color finish. In such embodiments, there are no exposed metal surfaces from which to create a short circuit. Once the frame has been completely coated with finish, said finish can be removed only in the areas where electrical connections are required, e.g., at the very end of the rimlock where electrical connectivity to the module via pins such as pogo pins can occur). In some embodiments, areas in which electrical connection is required are temporarily coated with a removable layer before the finish coating is applied, and then the temporary coating, along with and finish coating directly over it, is removed. By limiting the surface of exposed metal, the risk of moisture-induced and liquid-induced electrical shorts can be reduced as well.

Referring to FIG. 12, another aspect of the present technology for reducing the risk of liquid/moisture damage to electro-active eyewear is illustrated. As described above with reference to FIG. 6, physically compliant conductive material, e.g., 612, 614, can be used along a portion of the edge of lens, e.g., 600. In some embodiments insulating materials can be used along the remainder of the lens edge. In such an approach, moisture, oils, and salt may accumulate, and over time degrade the connections. In some embodiments of the present technology, a gasket, e.g., 1200 of compliant, but electrically insulating material, e.g., silicone, can be used to create a more compliant, and liquid/moisture-resistant fit for the lens around its edge. In some embodiments, the gasket 1200 can stretch around the circumference of the lens, resisting the ingress of moisture, oils, salt, and liquids. To enable electrical connectivity to the lens, apertures 1202 can be provided that accommodate physically compliant conductive material, e.g., 612, 614, formed to mate with the gasket.

In some embodiments of the present technology, a water repellent material can be used to inhibit moisture and liquids from filling spaces between components of electro-active eyewear such as rimlock components. Electrically-insulating greases, such Dow Coming® 111 valve lubricant and sealant, can be useful in this regard. Electrically-insulating grease can be applied while the frame is being assembled. A syringe equipped with a soft plastic tip can be used for application. Within the context of the rimlock shown in FIG. 7, electrically-insulating grease can be applied to the mating surfaces between the rimlock and the plastic insulating spacer, e.g., the surfaces where upper rimlock 712 mates to insulator 716, and where lower rimlock 716 mates to insulator 716. Other cavities, holes, and spaces between parts, such as those for screws and bushings used to assemble the rimlock can be filled or coated with electrically insulating grease.

Figure 9:
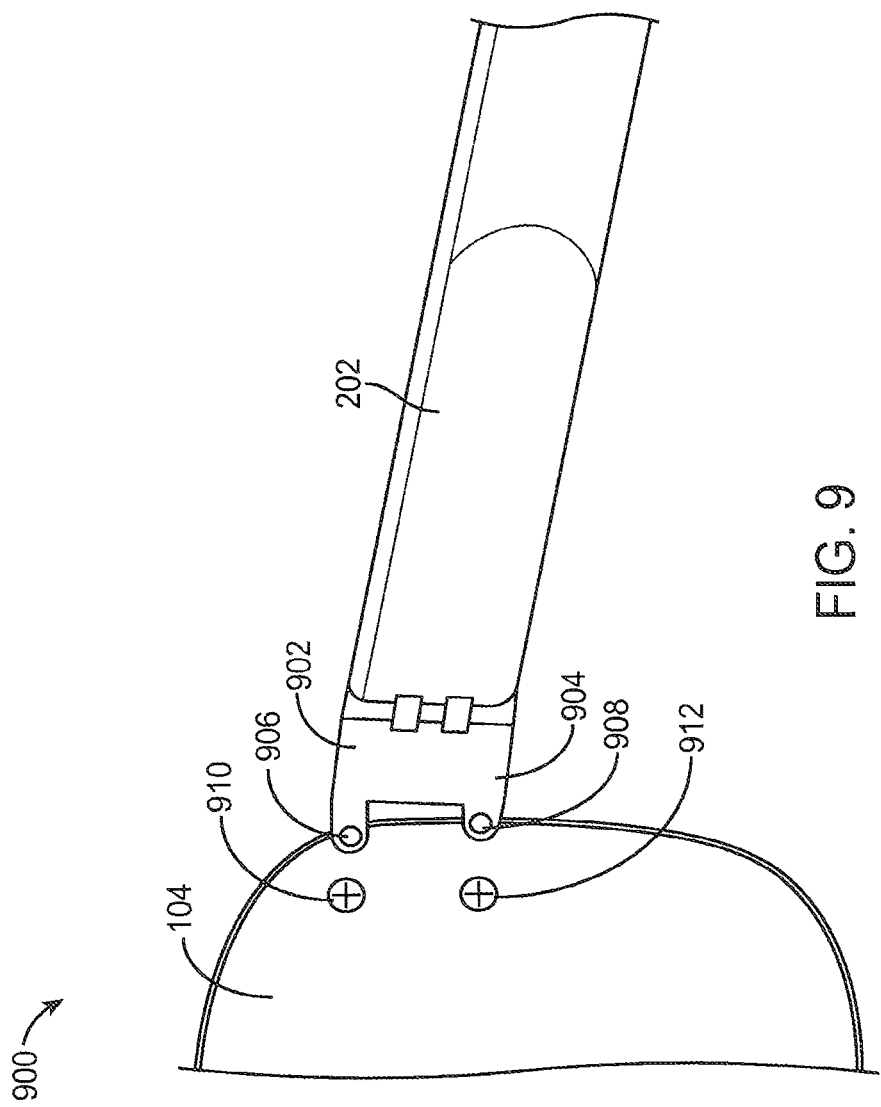
FIG. 9 illustrates a portion of electro-active spectacles in accordance with an aspect of the present technology.

FIG. 9 illustrates a portion of electro-active spectacles 900 in accordance with an aspect of the present technology. The electro-active spectacles 900 are implemented as rimless spectacles. That is, no upper or lower rim supports the electro-active lens 104.

As shown in FIG. 9, the electro-active spectacles 900 can include an electronic module 202 and an area to accept an electronic module 202. The electronic module 202 can be electrically coupled to the electro-active lens 104 using upper conducting member 902 and lower conducting member 904 (similar to upper conducting member 712 and lower conducting member 714 depicted in FIG. 7 and FIG. 8). Both the upper and lower conducting members 902 and 904 can be isolated or insulated conductors having a protected, internal conductive routes (e.g., a conductive wire) enclosed by a nonconductive material (e.g., a plastic). Alternatively, the upper and lower conducting members 902 and 904 can entirely comprise conductive material and can be coated with non-conductive material.

The frame of the electro-active spectacles 900 can support the electro-active lens 104 using upper support member 910 and lower support member 912. As an alternative, one of the upper and lower support members 910 and 912 can be used. Both the upper and lower supporting members 910 and 912 can be positioned through holes residing in the electro-active lens 104. The frame of the electro-active spectacles 900 can also be supported by upper contact 906 and lower contact 908. Both the upper and lower contacts 906 and 908 can be positioned through holes residing in the electro-active lens 104. The upper and lower contacts 906 and 908 can be compression pin connectors having a portion that can make electrical contact with appropriate elements of the electro-active lens 104.

While simultaneously supporting the electro-active lens 104, the upper contact 906 can make electrical contact with a first electrical lead of the electro-active lens (e.g., the first electrical lead 608 depicted in FIG. 6). Similarly, the lower contact 908 can support the electro-active lens 104 while also providing electrical contact to a second electrical lead of the electro-active lens (e.g., the second electrical lead 610 depicted in FIG. 6).

Both the upper contact 906 and the upper support member 910 can form part of an arm or extension of the upper conducting member 902. The upper contact 906 and the upper support member 910 can comprise one or more conductors (e.g., a wire) insulated or contained by an insulating material (e.g., plastic). The upper contact 906 and the upper support member 910 can be positioned in front of the electro-active lens 104 (and connect through to the back of the electro-active lens 104—as shown in FIG. 9) or can be positioned behind the electro-active lens 104 (and connect through to the front of the electro-active lens 104—not shown in FIG. 9). The lower contact 908 and the lower support member 912 can be positioned in a manner similar to the upper contact 906 and the upper support member 910 pairing (and can form part of an arm or extension of the upper conducting member 904).

Figure 20:
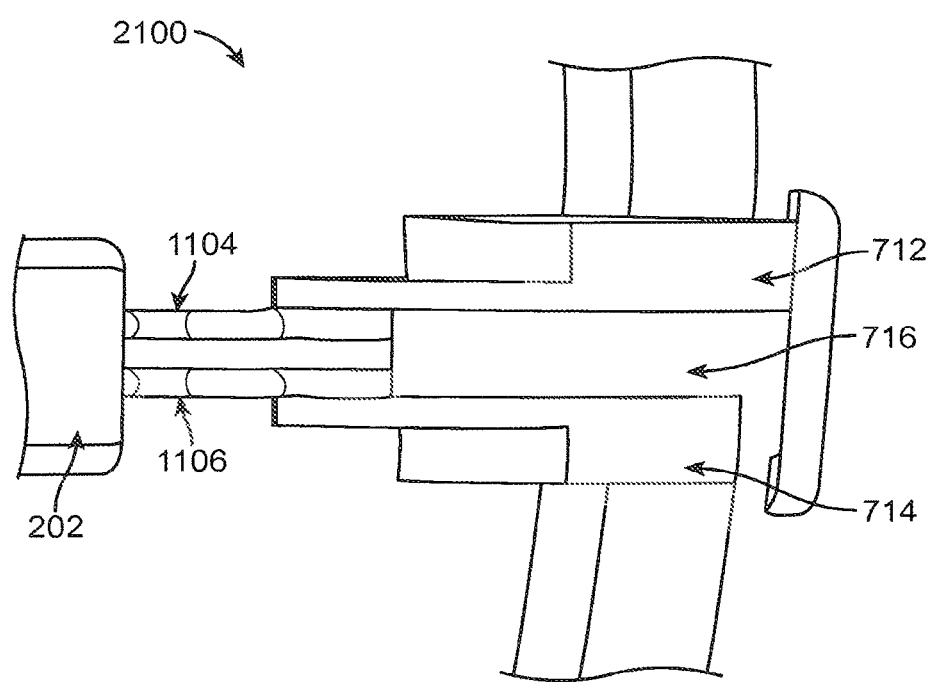
FIG. 20 illustrates a portion of a right temple of electro-active spectacles in accordance with an aspect of the present technology.
Figure 21:
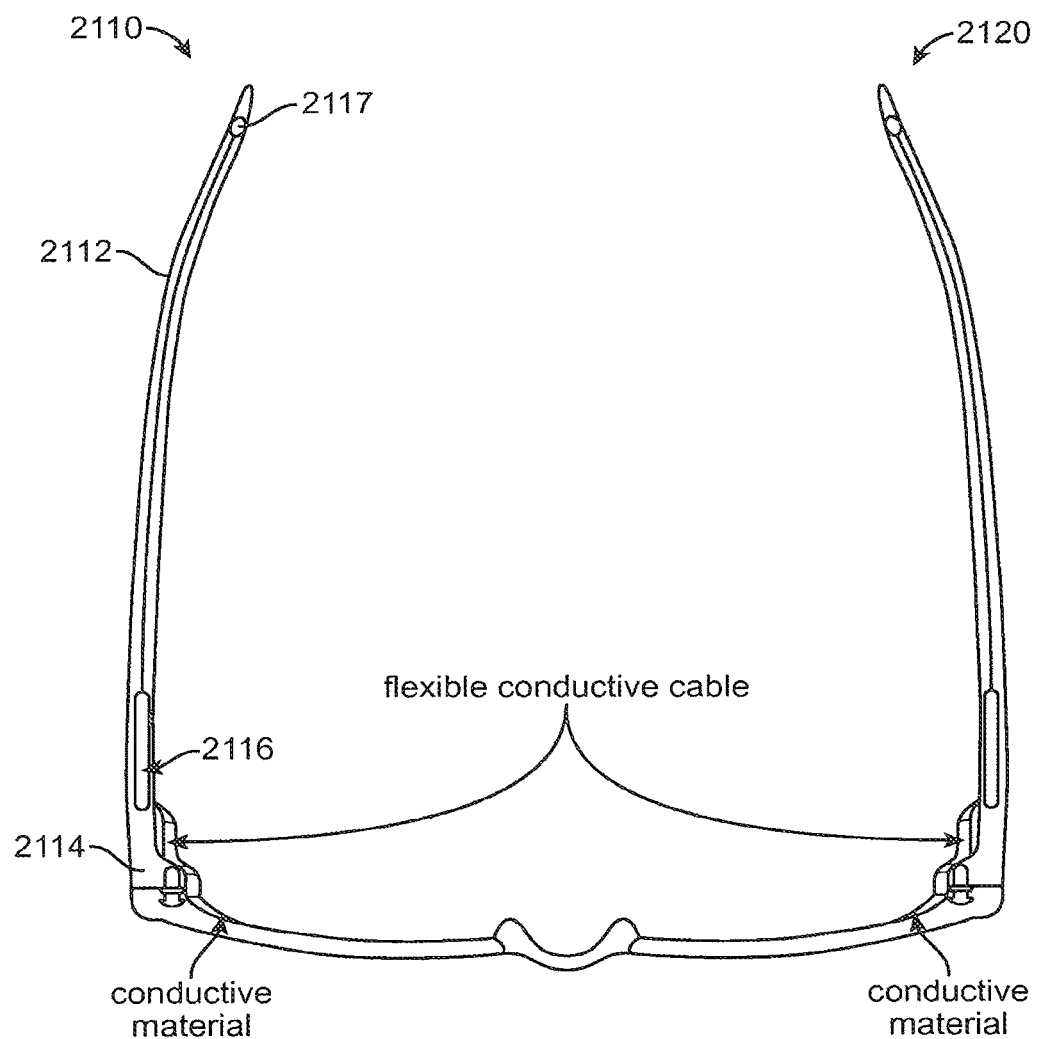
FIG. 21 illustrates a temple assembly in accordance with aspects of the present technology.

Referring to FIG. 20, a portion 2100 of electro-active eyewear in accordance with the present technology is shown. Module 202 is shown connected to conductive links 1104 and 1106 as described in connection with FIG. 11, but using upper rimlock 712 and lower rimlock 714 as conducting members connect to links 1104 and 1006 respectively. Insulating layer 716 is shown disposed between upper rimlock 712 and lower rimlock 714. A cable, e.g., 1108 can be used in place of conductive links 1104 and 1106.

Figure 10:
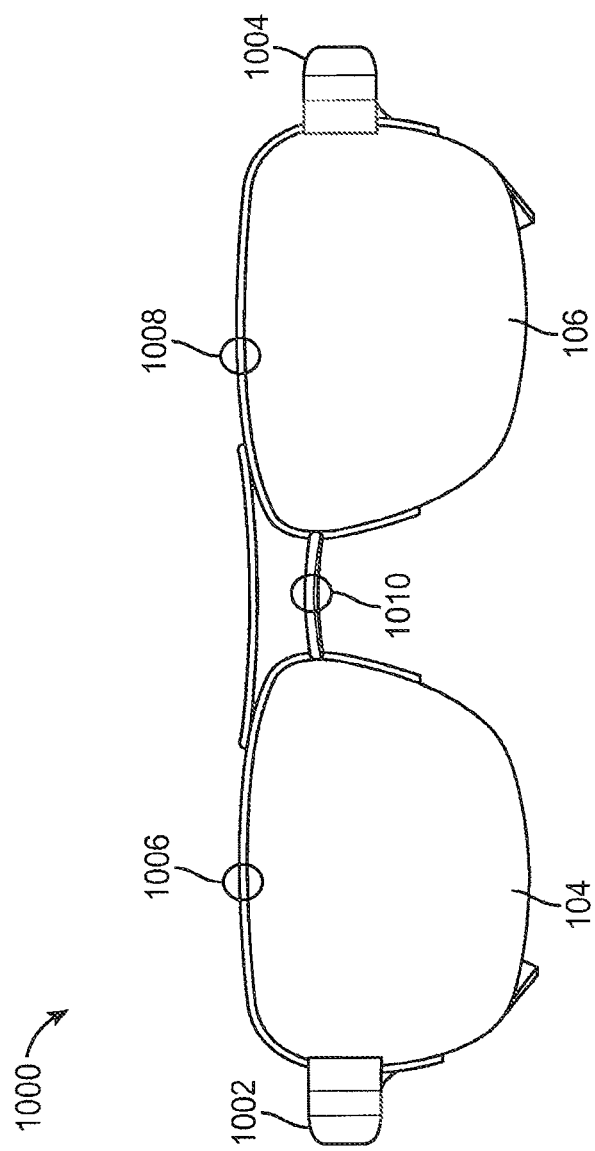
FIG. 10 illustrates a front a view of electro-active spectacles in accordance with an aspect of the present technology.

FIG. 10 illustrates a front a view of electro-active spectacles 1000 in accordance with an aspect of the present technology. The electro-active spectacles 1000 are implemented as partially-rimmed spectacles. Electrical connectivity between a right side of the electro-active spectacles (e.g., from a right-side portion of a frame 1002) to a left side of the electro-active spectacles (e.g., from a left-side portion of a frame 1004) can be provided in a variety of ways and is not limited to partially-rimmed designs. Electrical connectivity between the right-side portion 1002 and the left-hand portion 1004 can enable a single electronic module (e.g., the electronic module 202) located on either side to govern operation of both electro-active lenses 104 and 106. Further, this connectivity can ensure synchronized operation of the electro-active lenses 104 and 106 even if each of the electro-active lenses 104 and 106 is driven by separate electronic modules.

One or more conducting elements (e.g., conducting wires) can be embedded in a right-side upper frame or rim member 1006, a left-side upper frame or rim member 1008 and a bridge 1010 (as well as a left-side lower frame or rim member and a right-side lower frame or rim member for some frame designs). The conducting elements can be embedded and surrounded by insulating material. Embedding one or more conducting elements in the right side upper frame member 1006, the bridge 1010 and the left-side upper frame member 1008 can enable an electronic module on either side of the electro-active spectacles 1000 to control and/or synchronize operation of both electro-active lenses 104 and 106.

Rimless frames generally do not include the right-side upper frame member 1006 or the left-side upper frame member 1008. Rimless frames, however, do generally include a bridge 1010. Electrical connectively between the right-side portion 1002 and the left-hand portion 1004 of a rimless frame can be accomplished by using conductive elements incorporated into the manufacture of the electro-active lenses 104 and 106. Specifically, the bridge 1010 can electrically connect (e.g., using an embedded conductive link or a conductive link adjacent to or connected to the bridge) one or more conducting elements of the electro-active lenses 104 and 106 (e.g., using one or more ITO layers) which are themselves coupled to the right-side portion 1002 and the left-hand portion 1004, respectively, of a spectacles lens. Electrical connectively between the right-side portion 1002 and the left-hand portion 1004 of a rimless frame can also be accomplished by using conductive wires positioned within the grooves an electro-active lens (e.g., the groove 606 depicted in FIG. 6) to couple the right-side portion 1002 to the left-hand portion 1004. Portions of the groove on the top part of the electro-active lens or on the bottom part of the electro-active lens can be used to house or contain one or more conductive wires. The conductive wires positioned within such a groove can be insulated.

According to an aspect of the present technology, one or more conductive wires can be embedded in the upper rim members, the bridge and/or the lower rim members of electro-active spectacles and frames of the present technology during a mold casting process. That is, when the upper rim members, the bridge and/or the lower rim members are formed using a casting process, one or more conductive wires can be cast over when the upper rim members, the bridge and/or the lower rim members are prepared. Generally, thicker conductive wires can be used during such a process. Nylon is an example material that can be used to mold over one or more conductive wires to from the upper rim members, the bridge and/or the lower rim members.

According to an aspect of the present technology, one or more conductive wires can be embedded in the upper rim members, the bridge and/or the lower rim members of electro-active spectacles and frames of the present technology as each frame component is assembled. More specifically, any of the upper rim members, the bridge and/or the lower rim members that will be used to embed one or more conductive wires can be fabricated by two or more individual or separate pieces. For example, the upper rim members can be formed from two substantially symmetrical pieces of substantially the same shape—a front piece and a back piece which individually may appear to be a portion of the upper rim member split in half lengthwise. Prior to assembling the front and back pieces to form a complete upper rim member, one or more wires can be embedded (e.g., in a groove formed by mold or machined into the front and/or back pieces) between the front and back pieces (i.e., at the interface between the front and back pieces). The front and back pieces used to form the complete upper rim member can subsequently be combined, for example, using an adhesive.

According to an aspect of the present technology, one or more conductive wires can be embedded in the upper rim members, the bridge and/or the lower rim members of electro-active spectacles and frames of the present technology after the frame is assembled. Specifically, one or more grooves can be machined into the upper rim members, the bridge and/or the lower rim members that can be used to contain one or more conductive wires. The machined grooves can then be filled or covered with material to cosmetically hide the conductive wires. The assembled frame can then be polished to hide or mask the area in which the wires are embedded. Acetate is an example material that can be manipulated in this fashion to embed one or more conductive wires.

Figure 16:
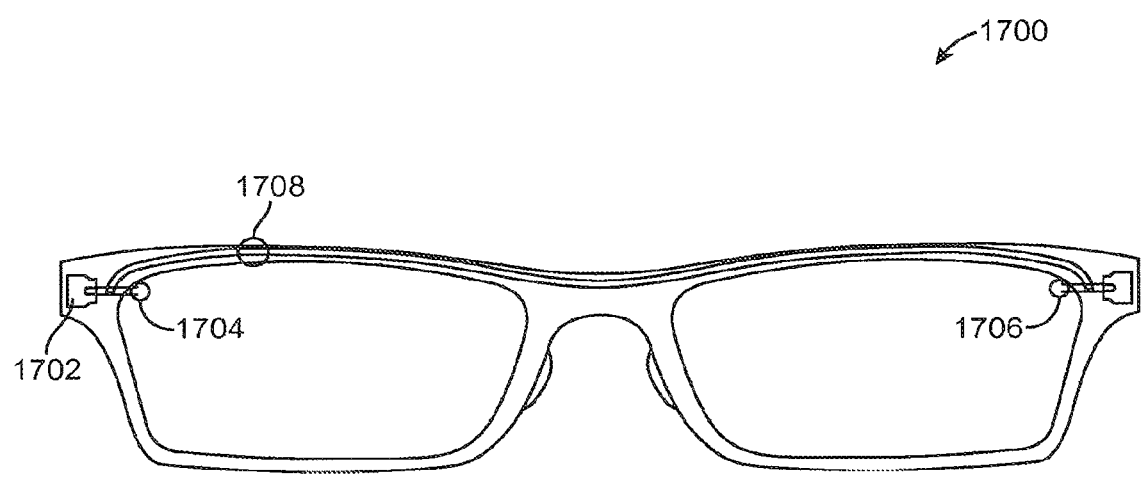
FIG. 16 illustrates an electro-active frame in accordance with an aspect of the present technology.

FIG. 16 illustrates electro-active frame 1700 in accordance with an aspect of the present technology. Electro-active lenses can be mounted within the electro-active frame 1700. For simplicity, a portion of electronics 1702 that can be used to govern operation of the electro-active lenses are shown. The electronics 1702 can represent a portion of an electronic module 202 described above and/or can represent conductive elements positioned to provide electrical connectivity between a temple of the electro-active frame 1700 and a front portion of the electro-active frame 1700. The electro-active frame 1700 is shown as including electronics 1702 on only one side of the electro-frame 1700 but is not so limited.

As further shown in FIG. 16, the electro-active frame 1700 can include conductive leads 1704 and 1706 and conductive link 1708. Conductive link 1708 can provide electrical connectivity from one side of the electro-active frame 1700 to the other side of the electro-active frame 1700. Conductive leads 1704 can provide electrical connectivity between electronics 1702 and a first electro-active lens mounted within the electro-active frame 1700. Conductive leads 1706 can provide electrical connectivity between the conductive link 1708 and a second electro-active lens mounted within the electro-active frame 1700.

As shown in FIG. 16, the conductive link 1708 can be embedded or positioned within the electro-active frame 1700. The conductive link 1708 can include any number of conductive elements (e.g., wires) that can be insulated or not insulated. If the electro-active frame 1700 uses driver electronics on each side of the frame 1700 (e.g., a master and slave driver electronics or electronic modules 202) then as few as only one single wire can comprise the conductive link 1708). If the electro-active frame 1700 has driver electronics on only one side of the electro-active frame 1700, then at least two wires or conductive elements can be used. The conductive link 1708 can be positioned inside the electro-active frame 1700 in accordance with any of the methods described above for embedding conductive links including, but not limited to, (1) embedding during a mold casting process; (2) embedding during an assembly process of the front frame portion of the electro-active frames 1700; and (3) embedding after assembly of the electro-active frames by providing a groove or route for the conductive link 1708. The conductive link 1708 can also use or can alternatively comprise the conductive layers of the electro-active lenses of the present technology that can be positioned into the frames 1700 as described above.

Figure 17:
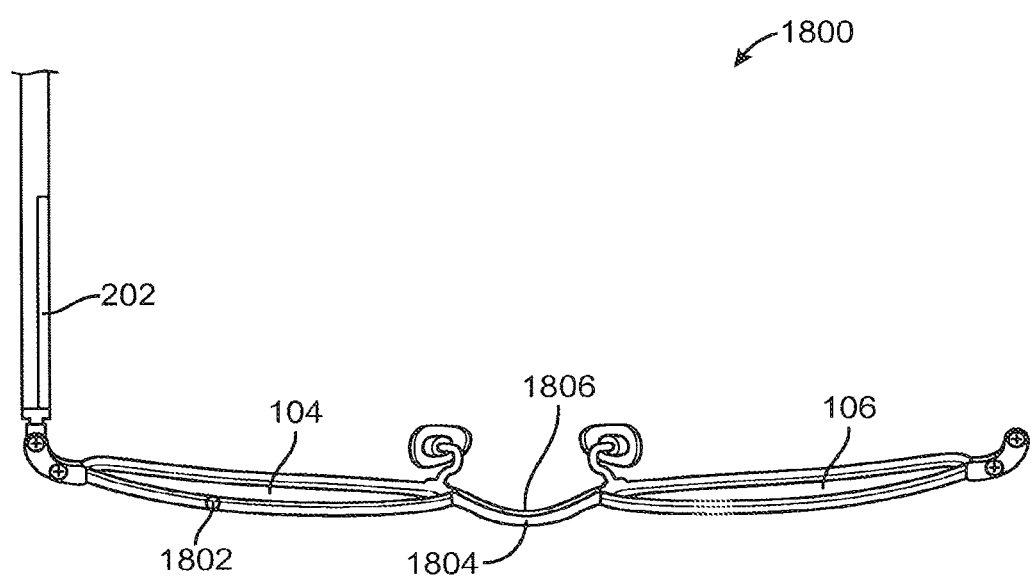
FIG. 17 illustrates electro-active spectacles in accordance with an aspect of the present technology.

FIG. 17 illustrates electro-active spectacles 1800 in accordance with an aspect of the present technology. The electro-active spectacles 1800 can include an electronic module 202. The electro-active spectacles 1800 can also include conductive link 1802. Conductive link 1802 can include any number of conductive elements (e.g., wires) that can be insulated or not insulated. Conductive link 1802 can provide electrical connectivity between the electronic module 202 and the electro-active lens 104 and the electro-active lens 106.

As shown in FIG. 17, a portion of the conductive link 1802 can be positioned or embedded within a portion of the frame of the electro-active spectacles 1800. For rimless spectacles, the conductive link 1802 can be routed through a groove in an electro-active lens (e.g., the groove 606 depicted in FIG. 6). As further shown in FIG. 17, the conductive link 1802 can be routed adjacent to a bridge 1804 of the electro-active spectacles 1800. For example, the conductive link can be routed through tubing 1806 that is positioned adjacent to the bridge 1804.

Figure 11:
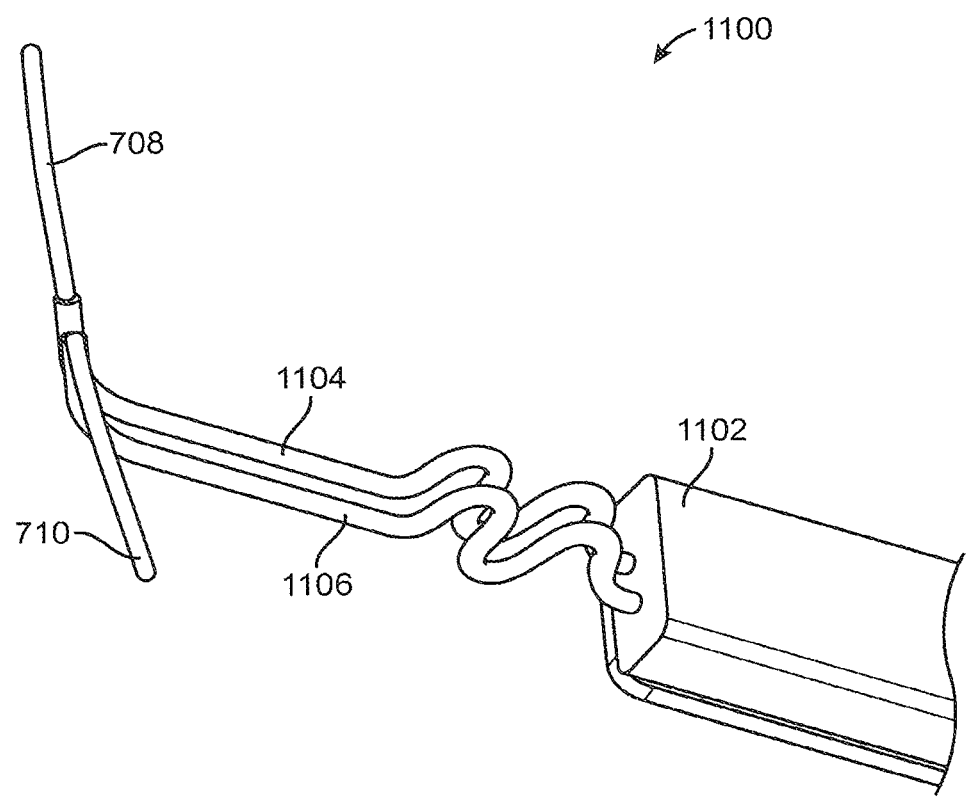
FIG. 11 illustrates a portion of a right temple of electro-active spectacles in accordance with an aspect of the present technology.

FIG. 11 illustrates a portion of a right side of a frame 1100, such as frame portion 700 of electro-active spectacles in accordance with an aspect of the present technology. The portion of the right side of a frame 1100 depicted in FIG. 11 can be coupled to an electro-active lens (not depicted in FIG. 11 for simplicity) through first conductor 708 and second conductor 710 as described in connection with FIG. 7. An electronics module 1102, similar to electronics module 202, is shown. The electronics module 202 can be coupled to the first conductor 708 through first conductive link 1104. The electronics module 1102 can further be coupled to the second conductor 710 through a second conductive link 1106.

The connection between each of links 1104, 1106, and electronics within module 1102 can be direct and sealed at the entrance to the module, or insulated leads (themselves sealed at entrance to the module 1102) can protrude from the module (not shown). The module 1102 itself can be sealed and potted so as to inhibit undesirable effects of liquid and moisture on the electronics therein.

The first and second link conductors 1104 and 1106 can be shaped and constructed to tolerate bending of other frame members (not depicted in FIG. 11 for simplicity) when the electro-active spectacles are opened and closed. The first and second link conductors 1104 and 1106 can contain one or more conducting elements (e.g., conducting wires) and can enclose them with insulating or non-conductive material or can themselves be entirely conductive. The links 1104, 1106 can be contained in a flexible conductive cable 1108, as shown with respect to a portion 1500 of the right side of a frame in FIG. 14. In some embodiments, such as those involving a video display, first conductor 708 and second conductor 710 can be connected to the display. In various embodiments, conductors 1104 and 1106 can be semi-rigid or rigid for at least some of their length. The first and second link conductors 1104 and 1106 can be considered to be continuous conductive links since they provide an uninterruptable physical connection between the module 1102 and the conductive elements of the electro-active lenses, e.g., 612, 614 via conductive elements 708 and 710.

Figure 14:
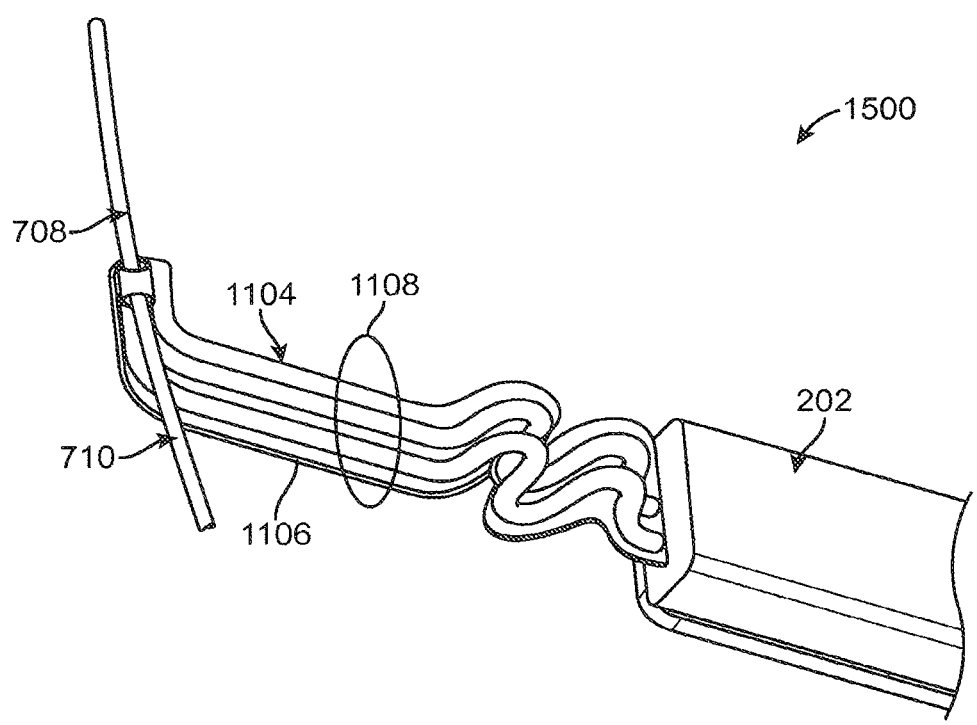
FIG. 14 illustrates a portion of a right temple of electro-active spectacles in accordance with an aspect of the present technology.
Figure 15:
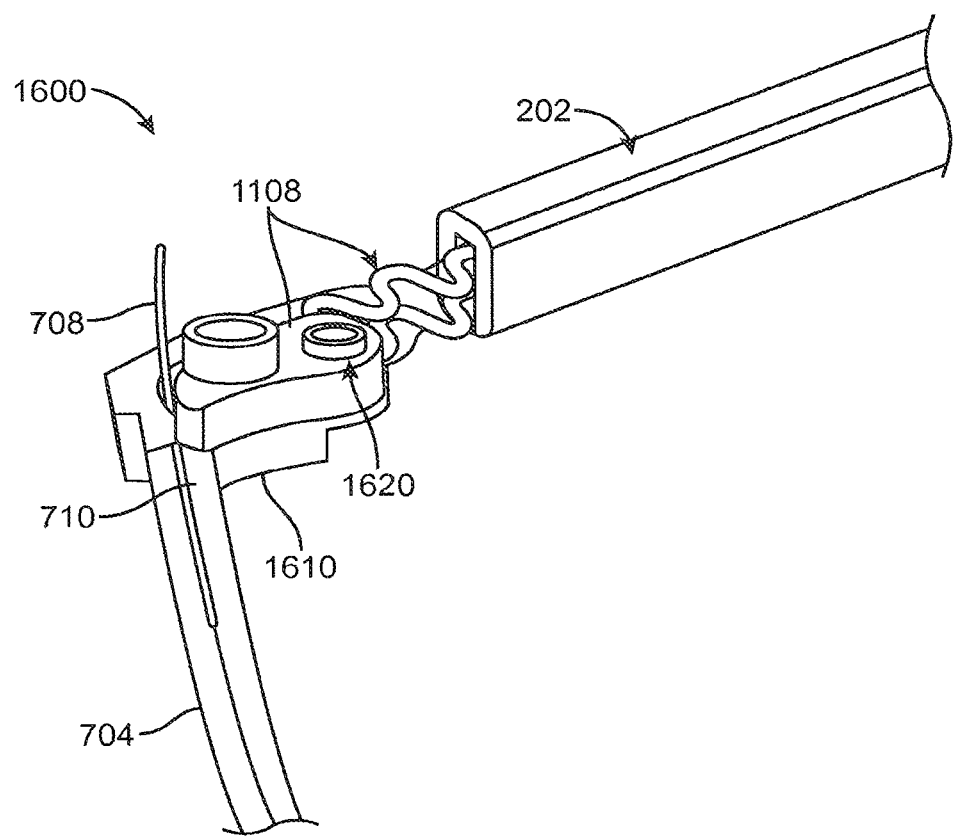
FIG. 15 illustrates a portion of a right temple of electro-active spectacles in accordance with an aspect of the present technology.

In embodiments of the present technology illustrated in each of FIG. 11 and FIG. 14, the conductive links 1104, 1106, and the cable 1108, can be of length that begins with the electronic module 200 and exits the temple either on the side of the temple to the front end piece of the temple closest to the hinge of the temple, and then bypasses the hinge connection between the temple and the frame front, and enters the frame front. FIG. 15 illustrates a portion 1600 of the right side of the frame showing the module 202, flexible cable 1108, first conductor 708, second conductor 710, rim wire lower portion 704, lower rimlock 1610, and insulating layer 1620, with the flexible cable 1108 bypassing the hinge elements formed in the insulating layer to the right and around to the front of the eyewear. Flexible conductive links 1104 and 1106 can be used in place of flexible cable 1108.

Figure 19:
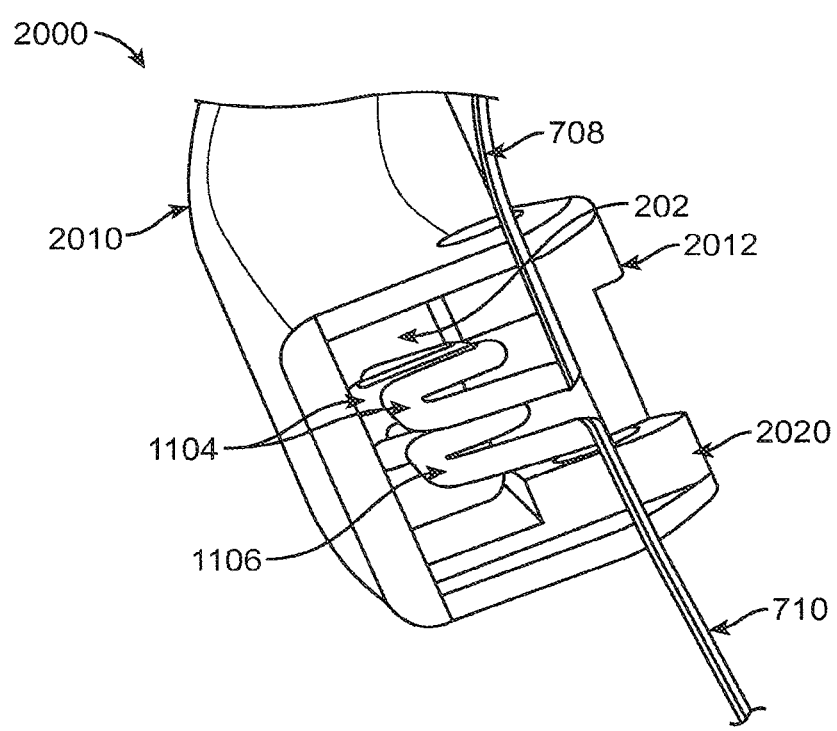
FIG. 19 illustrates a portion of a right temple of electro-active spectacles in accordance with an aspect of the present technology.

Referring to FIG. 19, the portion 1100 shown in FIG. 11 is shown as a portion 2000 from another perspective with the body of the temple 2010. The module 202 is shown inside the body of the temple 2010, the conductive links 1104 and 1106 are shown connecting to upper portion first conductor 708 and lower portion second conductor 710 respectively after being routed around a non-conducting upper rimlock 2012 and lower rimlock 2014. Embodiments of the present technology similar to that illustrated in FIG. 19 can use a cable, e.g., 1108, instead of separate conductors 1104, 1006.

In some embodiments, links 1104, 1106 and cable 1108 can be made from conductive compressible members. Conductive compressible members can include conductive rubber and metal rubber. Metal rubber is a name for conductive plastic polymers with metal ions, it is a self-assembling nano-composite, and is flexible and durable across a broad range of pressures, temperatures, tensions, exposure to chemicals. It retains its properties upon being returned to a ground state. It can carry data and electrical power.

In some embodiments, the flexible conductive cable itself can be an insulating element between the upper rimlock and the lower rimlock. In some embodiments, first conductor 708 and second conductor 710 are not used, and the conductive links 1104, 1106 (either as separate links or as elements of cable 1108) connect directly to the leads and conductive material (e.g., 608/612 and 610/614, respectively) of the electro-active lens (e.g., electro-active lens 600).

In some embodiments, the conductive links 1104, 1106 (either as separate links or as elements of cable 1108) are connected to contact point located within the rim of the eyeglass frame, on the lens surface, connected to the lens or frame surface. In other embodiments of the technology, the conductive links 1104, 1106 (either as separate links or as elements of cable 1108) are connected to contact points on or connected to an electronic display or controller, affixed to the eyeglass frame front or the lens, or housed within the eyeglass frame front or lens. In various embodiments, the conductive links 1104, 1106 (either as separate links or as elements of cable 1108) can be conductive sealed wires.

The connectivity mechanisms illustrated in FIG. 11 and described above can be used for any type of frame style—that is, for fully rimmed, partially-rimmed and rimless frames of the present technology.

Figure 13:
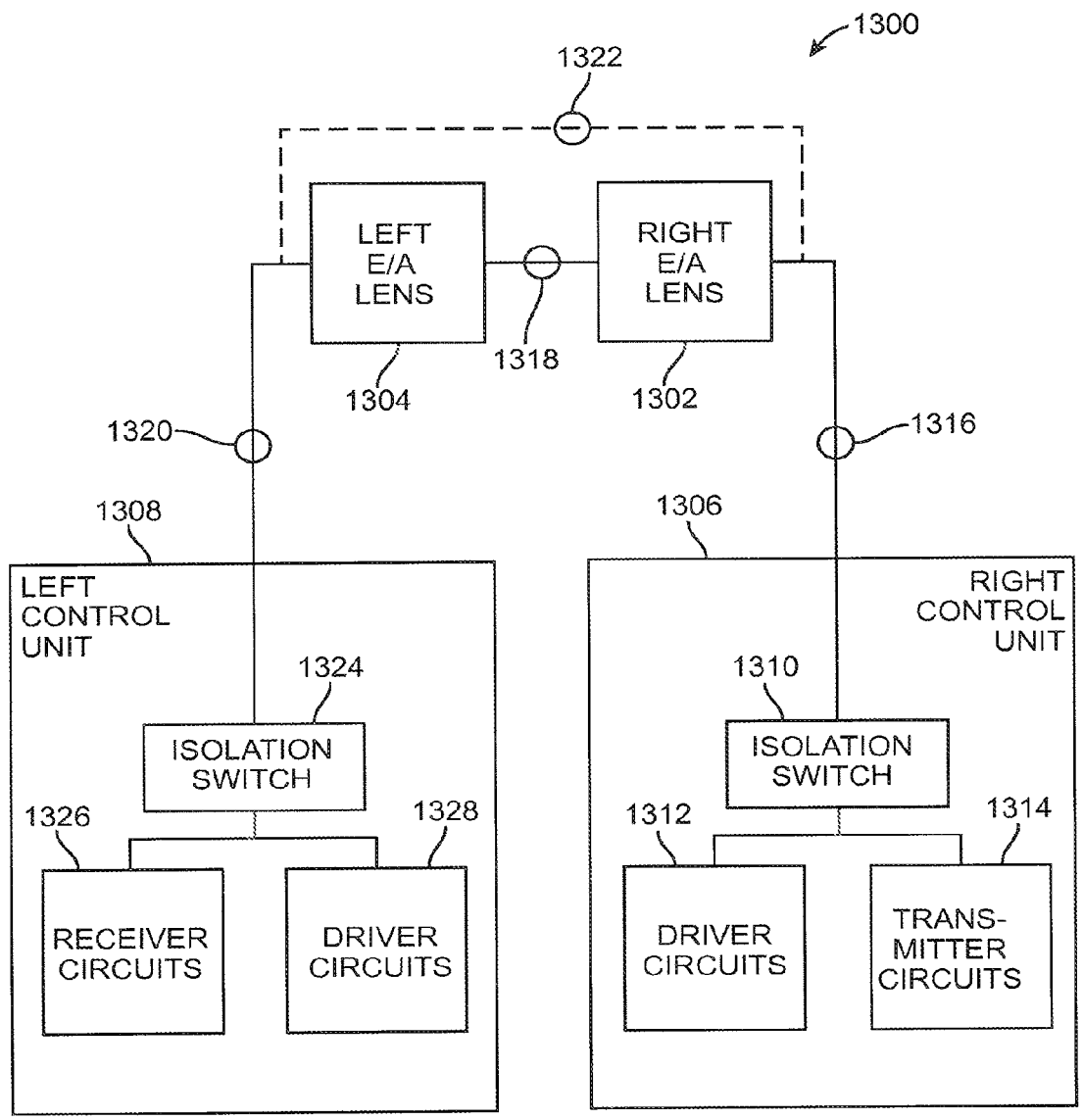
FIG. 13 illustrates a representative block diagram of electro-active spectacles accordance with an aspect of the present technology.

FIG. 13 illustrates a representative block diagram of electro-active spectacles 1300 in accordance with an aspect of the present technology. The electro-active spectacles 1300 can represent the electro-active spectacles of the present technology described above (e.g., the electro-active spectacles 100). The electro-active spectacles 1300 can include a right electro-active lens 1302 and a left electro-active lens 1304. The right and left electro-active lenses 1302 and 1304 can represent the first and second electro-active lenses 104 and 106 described earlier. The electro-active spectacles 1300 can include a right control unit 1306 and a left control unit

1308. The left and right control units 1306 and 1308 can each represent an electronic module 202, or a portion thereof, described above.

The right control unit 1306 can include an isolation switch 1310, driver circuits 1312, and transmitter circuits 1314. The driver circuits 1312 can generate a driver signal for operating (e.g., activating) the right electro-active lens 1302. For example, to activate the right electro-active lens 1302, the driver circuits 1312 can provide, generate or transmit a driver signal or activation signal. Further, to deactivate the right electro-active lens 1302, the driver circuits 1312 can simply stop providing, generating or transmitting the driver signal.

The transmitter circuits 1314 can generate a synchronization signal for coordinating operation of the right and left electro-active lenses 1302 and 1304. Specifically, the transmitter circuits 1314 can transmit a synchronization signal instructing the left electro-active lens 1304 to activate or deactivate. As an example, the left electro-active lens 1304 can be activated based on receipt of the synchronization signal or a synchronization signal of a first type instructing activation. Further, the left electro-active lens can be deactivated based on the absence of the synchronization signal or receipt of a synchronization signal of a second type instructing deactivation. As a result, the right and left electro-active lenses 1302 and 1304 can be activated and deactivated at substantially the same time.

The isolation switch 1310 can determine when the driver circuits 1312 and the transmitter circuits 1314 can access a conductive link 1316 coupling the right electro-active lens 1302 to the control unit 1306. The conductive link 1316 can comprise one or more conductive wires. The conductive link 1316 can represent one or more of the connectivity mechanisms depicted and described above (e.g., the routing and connectivity features illustrated in FIG. 11 and described above).

When the electro-active spectacles are implemented with only a single control unit (e.g., the control unit 1306), then the control unit 1306 can control operation of both the right and the left electro-active lenses 1302 and 1304. Under such a scenario, the isolation switch 1310 and transmitter circuits 1314 can be optional. Further, the left and right electro-active lenses 1302 and 1304 can be activated at substantially the same time by a driver signal provided by the driver circuits 1312.

A communications link between the right and left control units 1306 and 1308 can comprise any portion of the conducive link 1316, conductive elements within the right electro-active lens 1302, a bridge conductive link 1318 contained within or adjacent to a bridge of the electro-active spectacles 1300, conductive elements within the left electro-active lens 1304, and a conductive link 1320. The conductive link 1320 can comprise one or more conductive wires and can represent one or more of the connectivity mechanism depicted and described above (e.g., the routing and connectivity features illustrated in FIG. 11 and FIG. 12 and described above). The communications link between the right and left control units 1306 and 1308 can also include or alternatively include a frame conductive link 1222 (shown in phantom in FIG. 13).

The frame conductive link 1322 can include one or more conductive wires wrapped over the right and left electro-active lens 1302 and 1304—e.g., either embedded within a portion of the frame and/or contained in a groove of the right and left electro-active lenses 1302 and 1304 as described above. The frame conductive link 1322 can also include conductive elements of the right and left electro-active lenses 1302 and 1304 (e.g., one or more layers of ITO or other transparent conductive layers of the right and left electro-active lenses 1302 and 1304). For example, the frame conductive link 1322 can be a wireless link that uses conductive layers of the right and left electro-active lenses 1302 and 1304 as antennas to facilitate communication and/or synchronization between the right and left electro-active lenses 1302 and 1304. Alternatively, other conductive elements can be embedded within the electro-active spectacles of the present technology to facilitate communication and/or synchronization between the right and left electro-active lenses 1302 and 1304. One or more of these embedded antennas could also provide a wireless communication link between the electro-active spectacles of the present technology and a remote communication device.

Overall, the right control unit 1306 can communicate with the left control unit 1308 and/or can operate the left electro-active lens 1304 using a single conductive wire or link. The single conductive wire can also be used to operate the right electro-active lens 1302. The single conductive wire or link can be embedded within a portion of a frame and can include conductive elements of the electro-active lenses.

The left control unit 1308 can include an isolation switch 1324, driver circuits 1326, and receiver circuits 1328. The driver circuits 1326 can generate a driver signal for operating (e.g., activating) the left electro-active lens 1302. The receiver circuits 1326 can receive and process a synchronization signal transmitted by the right electro-active module 1306. The isolation switch 1324 can determine when the driver circuits 1312 and the receiver circuits 1328 can access the conductive link 1320 coupling the left electro-active lens 1304 to the control unit 1308.

The receiver circuits 1326 can listen for a synchronization signal transmitted over conductive link 1320. The receiver circuits 1326 can listen periodically or randomly for a specific or random amount of time. Once a synchronization signal is received, the control unit 1308 can operate accordingly—i.e., either activate or deactivate the left electro-active lens 1304 using a driver signal transmitted by the driver circuits 1328.

The transmitter circuits 1314 can transmit a synchronization signal in response to detection of a head tilt change of the user (e.g., detected by a gyroscope or accelerometer included in the right control unit 1306—not illustrated for clarity) or manual command issued by the user. The synchronization signal transmitted by the transmitter circuits 1314 can be coded to distinguish it from noise and to prevent false triggering.

Referring to FIG. 18, embodiments of the present technology using plug/receptacle connections are illustrated in the context of electro-active eyewear 1900. In some of those embodiments, the electrical module 202 has connector leads, e.g., 1108 that have one end sealed within the module 202. This sealing is substantially water-resistant or water-proof. The other end of cable 1108 terminates in a plug 1910 that mates with a receptacle (not shown) on the backside of the eyewear frame front (or on an edge of the frame front, or on one of the end pieces of the frame front) whereby connection is provide to the lens. In other embodiments, the plug and receptacle can be reversed. A plug/receptacle connection 1930 also can be used to connect the module 202 with a battery 302. The plug/receptacle connections can be unpluggable or permanent once plugged. In some embodiments, the intermediate electrical contact is located at one of: a rim of the eyewear, the rear ⅓ of the temple, the middle of the temple, the forward ⅓ of the temple, the rimlock or hinge, of the eyewear, a surface of the optical functional member, a frame front of the eyewear, an electronic display, an electronic controller, and between the rim and the lens of the eyewear.

While various embodiments of the present technology have been described above, it should be understood that they have been presented by way of example and not limitation. Any conductive element described above (e.g., the upper or lower portions of the frame) can be entirely conductive (and possibly coated with non-conductive material) or can contain an embedded or buried conductive element (e.g., a conductive core) and a non-conductive outer or surrounding layer. Further, any conductive link—e.g., described or referred to as an electrical wire or connection—could alternatively, or in addition thereto, be or include an optical conductive link as will be apparent to one skilled in the pertinent art. The exemplary techniques for coupling or connecting the electrical elements of the electro-active spectacles of the present technology (e.g., the controlling electronics and power supplies and electro-active lenses) using embedded conductive links can be used to embed one or more conductive optical links (e.g., one or more optical fibers) as will be apparent to one skilled in the pertinent art.

These applications can be that of, by way of example only, by way of example only, electronic focusing eyeglasses, electro-active eyeglasses, fluid lenses being activated by way of an electronic actuator, mechanical or membrane lenses being activated by way of electronics, electro-chromic lenses, electronic fast tint changing liquid crystal lenses, lenses whose tint can be altered electronically, lenses that by way of an electrical charge can resist or reduce the attraction of dust particles, lenses or eyeglass frames housing or having an electronic display affixed thereto, electronic eyewear providing virtual reality, electronic eyewear providing 3-D capabilities, electronic eyewear providing gaming, and electronic eyewear providing augmented reality.

Overall, it will be apparent to one skilled in the pertinent art that various changes in form and detail can be made therein without departing from the spirit and scope of the technology. Therefore, the present technology should only be defined in accordance with the following claims and their equivalents.

What is claimed is:

1. Eyewear comprising:
an optical functional member comprising a lens;
an electrically-insulating gasket disposed on an edge of the lens;
an electronics module comprising electronics for controlling the optical functional member; and
at least one sealed electrical connective element connecting the electronics of the electronics module to the optical functional member;
wherein the gasket extends around the entire circumference of the lens;
wherein the gasket defines at least one aperture therethrough;
wherein the electrical connective element connects to the optical functional member through the aperture; and
wherein the gasket is not conductive.

2. The eyewear of claim 1 wherein:
the optical functional member comprises at least one electrical connector,
the connective element directly connects the electronics of the electronics module to the at least one electrical connector of the optical functional member, and
the electronics module is sealed.

3. The eyewear of claim 1:
further comprising at least one intermediate electrical contact; and
wherein:
the optical functional member comprises at least one electrical connector, and
the connective element connects the electronics of the electronics module to the at least one electrical connector of the optical functional member through the at least one intermediate electrical contact.

4. The eyewear of claim 3 wherein:
the intermediate electrical contact comprises a plug-and-receptacle.

5. The eyewear of claim 3 wherein the intermediate electrical contact is located at one of: a rim of the eyewear, a surface of the optical functional member, a frame front of the eyewear, an electronic display, or an electronic controller.

6. The eyewear of claim 1 wherein:
the eyewear further comprises a temple and a rimlock, and wherein:
the electronics module is located in the temple, and
the connective element is routed from the electronics module through the rimlock to the optical functional member.

7. The eyewear of claim 6 wherein:
the rimlock comprises an upper rimlock and a lower rimlock, and
the connective element is routed between the upper rimlock and the lower rimlock.

8. The eyewear of claim 6 wherein:
the rimlock comprises an upper rimlock and a lower rimlock, and
the connective element forms a layer between the upper rimlock and the lower rimlock.

9. The eyewear of claim 8 wherein:
the layer is an electrically insulating layer.

10. The eyewear of claim 1 wherein:
the connective element is a conductive compressible member.

11. The eyewear of claim 10 wherein:
the conductive compressible member is conductive rubber.

12. The eyewear of claim 1 wherein:
the connective element comprises a multi-conductor cable.

13. The eyewear of claim 1 wherein:
the at least one sealed electrical conductive element is at least one of: moisture resistant, salt resistant, and moisture proof.

* * * * *